(12) United States Patent
McKillen et al.

(10) Patent No.: US 10,794,409 B2
(45) Date of Patent: Oct. 6, 2020

(54) TURBULENCE GENERATION SYSTEM

(71) Applicant: Honda Motor Co., Ltd., Tokyo (JP)

(72) Inventors: James T. McKillen, Marysville, OH (US); Matthew L. Metka, Plain City, OH (US); Craig Kline, Bellefontaine, OH (US); Ann Boh Stockburger, Powell, OH (US); Shujiro Yano, Tochigi (JP); Atsushi Ogawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 196 days.

(21) Appl. No.: 16/146,195

(22) Filed: Sep. 28, 2018

(65) Prior Publication Data
US 2019/0101143 A1    Apr. 4, 2019

Related U.S. Application Data

(60) Provisional application No. 62/565,857, filed on Sep. 29, 2017.

(51) Int. Cl.
*G01M 9/04* (2006.01)
*F15D 1/10* (2006.01)

(52) U.S. Cl.
CPC ............... *F15D 1/10* (2013.01); *G01M 9/04* (2013.01)

(58) Field of Classification Search
CPC .............................................. G01M 9/00–04
See application file for complete search history.

(56) References Cited

U.S. PATENT DOCUMENTS

| 1,968,382 A | 7/1934 | Fales | |
|---|---|---|---|
| 3,005,339 A | * 10/1961 | Loftin, Jr. | ............... G01M 9/04 73/147 |

(Continued)

FOREIGN PATENT DOCUMENTS

| DE | 19822713 | 11/1999 | |
|---|---|---|---|
| DE | 102009019532 A1 | * 12/2009 | ............. G01M 9/04 |

(Continued)

OTHER PUBLICATIONS

Cekli et al. "Resonant Enhancement of Turbulent Energy Dissipation" Physical Review Letters, 2010, vol. 105, pp. 1-4.

(Continued)

*Primary Examiner* — Nguyen Q. Ha
(74) *Attorney, Agent, or Firm* — Rankin, Hill & Clark LLP

(57) ABSTRACT

A turbulence generation system includes a vane assembly to direct airflow from a nozzle. The vane assembly includes at least two vertically oriented nozzle contraction vanes, a pair of vertically oriented nozzle exit vanes, and at least one horizontally oriented vane. The nozzle contraction vanes are located within the nozzle upstream of a nozzle air outlet. Each nozzle contraction vane rotationally moves independent of the other nozzle contraction vane to generate airflow pressure loss, turbulence and/or flow vectoring. The nozzle exit vanes are downstream of the air outlet and rotationally move to generate higher angles of dynamic yaw or a quick yaw input. The nozzle exit vanes are positioned laterally inward from first and second sidewalls of the nozzle. The horizontally oriented vane is positioned downstream of nozzle contraction vanes and upstream of the nozzle exit vanes and rotationally moves to generate up-wash or down-wash.

20 Claims, 21 Drawing Sheets

(56) References Cited

U.S. PATENT DOCUMENTS

| | | | |
|---|---|---|---|
| 4,750,355 A | | 6/1988 | Urabe et al. |
| 5,025,659 A | | 6/1991 | Starr, Jr. et al. |
| 5,364,303 A | | 11/1994 | Terry |
| 5,435,175 A | * | 7/1995 | Kramer .................. G01M 9/04 138/45 |
| 5,495,754 A | | 3/1996 | Starr, Jr. et al. |
| 5,861,585 A | | 1/1999 | Van Every et al. |
| 6,083,110 A | | 7/2000 | Kitchen et al. |
| 6,378,361 B1 | | 4/2002 | Larsen et al. |
| 6,588,287 B2 | | 7/2003 | Gleason et al. |
| 6,644,355 B1 | | 11/2003 | Gleason |
| 6,748,800 B2 | | 6/2004 | Lacey, Jr. |
| 7,107,831 B2 | | 9/2006 | Markstaller et al. |
| 7,263,879 B1 | | 9/2007 | Puskarz |
| 7,481,290 B2 | | 1/2009 | Pendzich |
| 9,279,740 B2 | | 3/2016 | Kerestan et al. |
| 2005/0189092 A1 | | 9/2005 | Jahn et al. |

FOREIGN PATENT DOCUMENTS

| | | | | | |
|---|---|---|---|---|---|
| JP | 61120036 A | * | 6/1986 | .............. | G01M 9/04 |
| JP | 07055643 A | * | 3/1995 | .............. | G01M 9/04 |

OTHER PUBLICATIONS

Cekli et al. "Tailoring turbulence with an active grid" Exp Fluids, 2010, vol. 49, pp. 409-416.

Quinn et al. "A new low-turbulence wind tunnel for animal and small vehicle flight experiments" Royal Society, 2016, pp. 1-16.

* cited by examiner

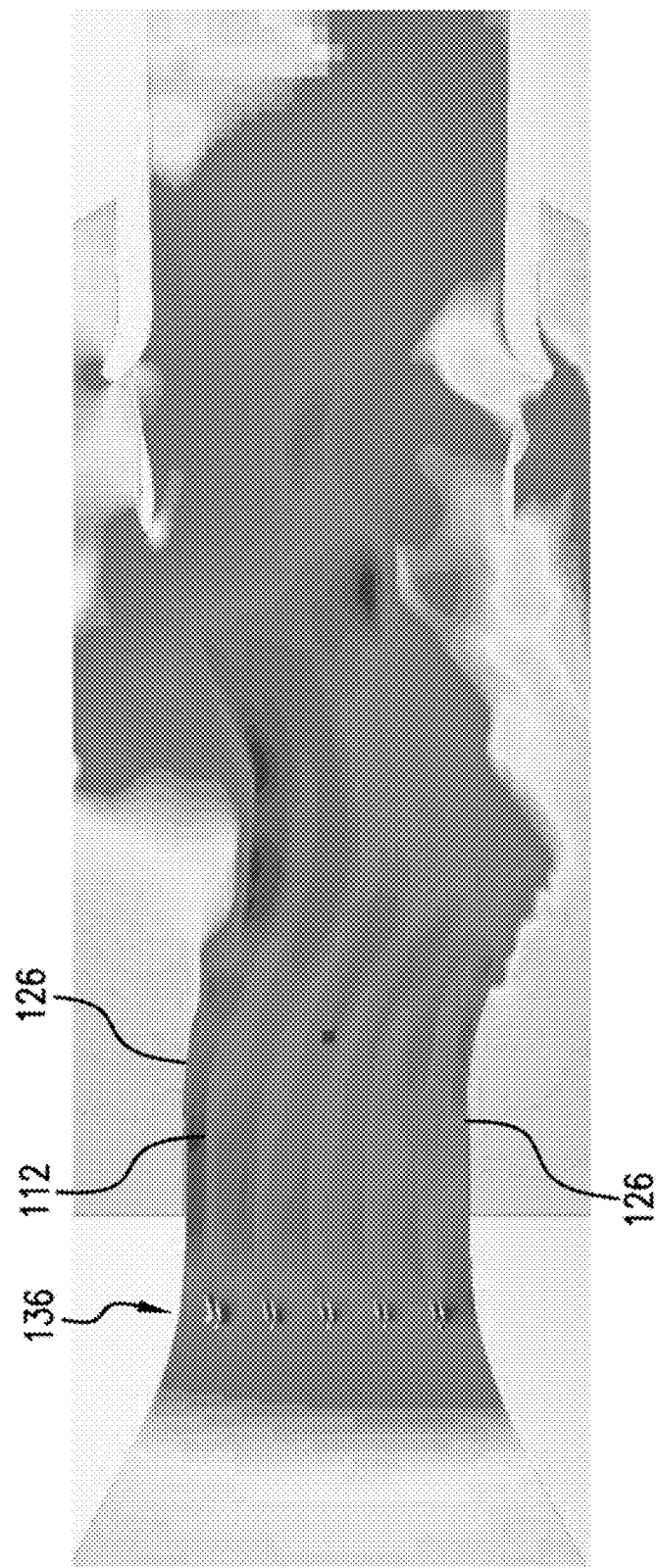

TURBULENCE GENERATION SYSTEM

The present application claims priority to U.S. Provisional Patent Application Ser. No. 62/565,857 filed Sep. 29, 2017, which is incorporated herein.

BACKGROUND

A wind tunnel is typically used to evaluate the aerodynamic performance of an automotive vehicle in an ideal environmental condition. A turbulence generation system may be installed in a wind tunnel to simulate a variety of more realistic airflow conditions. Typically, a wind tunnel includes a test section upon which a vehicle to be tested is positioned. An airflow generator such as a fan or blower is used to create an air stream that is directed through a contraction section of the wind tunnel and toward the test section. Instrumentation is provided for measuring desired information of the vehicle, such as force transducers to measure aerodynamic wind drag and/or microphones to evaluate aerodynamic acoustic performance. Wind tunnels for use in the aerodynamic and acoustic testing of vehicles require careful design to ensure accurate and reproducible simulation of road conditions at the applicable speeds and thus provide reliable design data. A turbulence generation system that recreates real world flow conditions requires a special concept and control strategy in order to replicate the actual turbulence, pressure deficits and flow quality that a vehicle experiences outdoors.

BRIEF DESCRIPTION

In accordance with one aspect, a turbulence generation system for use in aerodynamic and acoustic testing of a vehicle comprises a contraction section including a nozzle having an air inlet and an air outlet, and a vane assembly positioned in cooperative relationship with the contraction section to direct airflow from the nozzle. The vane assembly includes at least two vertically oriented nozzle contraction vanes, a pair of vertically oriented nozzle exit vanes, and at least one horizontally oriented vane. The nozzle contraction vanes are located within the nozzle upstream of the air outlet. Each nozzle contraction vanes is configured to rotationally move independent of the other nozzle contraction vane to generate airflow pressure loss, turbulence and/or flow vectoring. The nozzle exit vanes are downstream of the air outlet and configured to rotationally move to generate higher angles of dynamic yaw and/or a quick yaw input to capture events such as a passing vehicle or gusting winds. One of the nozzle exit vanes is positioned laterally inward from a first sidewall of the nozzle and the other nozzle exit vane is positioned laterally inward from a second sidewall of the nozzle which is laterally spaced from the first sidewall. The horizontally oriented vane is positioned downstream of nozzle contraction vanes and upstream of the nozzle exit vanes and configured to rotationally move to generate up-wash or downwash, including replication of the appropriate pressure deficit that would be experienced by a vehicle while driving in traffic.

In accordance with another aspect, a turbulence generation system for use in aerodynamic and acoustic testing of a vehicle comprises a contraction section including a nozzle having a floor and first and second sidewalls. The nozzle defines an air inlet and an air outlet. A vane assembly is positioned in cooperative relationship with the contraction section to direct airflow from the nozzle. The vane assembly includes a plurality of nozzle contraction vane stations, a pair of vertically oriented nozzle exit vanes, and a pair of horizontally oriented vanes. Each nozzle contraction vane station is located within the nozzle upstream of the air outlet and includes two vertically oriented nozzle contraction vanes movably connected to a common frame assembly. Each nozzle contraction vane is configured to rotationally move independent of the other nozzle contraction vane to generate airflow pressure loss, turbulence and/or flow vectoring. The nozzle exit vanes are deployable from a stowed condition laterally outward of the respective first and second sidewalls to an extended condition downstream of the air outlet and laterally inward of the respective first and second sidewalls. The nozzle exit vanes are configured to rotationally move to generate higher angles of dynamic yaw and/or a quick yaw input to capture events such as a passing vehicle or gusting winds. The horizontally oriented vanes are positioned downstream of nozzle contraction vanes and upstream of the nozzle exit vanes. The horizontally oriented vanes are configured to move in a vertical direction relative to the nozzle floor and are configured to rotationally move to generate up-wash or downwash, including replication of the appropriate pressure deficit that would be experienced by a vehicle while driving in traffic.

In accordance with yet another aspect, a turbulence generation system for use in aerodynamic and acoustic testing of a vehicle comprises a contraction section including a nozzle having a floor and first and second sidewalls. The nozzle defines an air inlet and an air outlet. A vane assembly is positioned in cooperative relationship with the contraction section to direct airflow from the nozzle. The vane assembly includes a plurality of nozzle contraction vane stations, a pair of vertically oriented nozzle exit vanes, and a pair of horizontally oriented vanes. The nozzle contraction vane stations are located within the nozzle upstream of the air outlet. Each nozzle contraction vane station includes two vertically oriented nozzle contraction vanes movably connected to a common frame assembly. Each nozzle contraction vane is configured to rotationally move independent of the other nozzle contraction vane to generate airflow pressure loss, turbulence and/or flow vectoring. The nozzle contraction vane stations can be equally spaced from one another with one of the nozzle contraction vane stations positioned on a vertical centerline of the nozzle. Each nozzle contraction vane station is movable between a retracted, stowed condition and an extended, use condition, where in the retracted condition each nozzle contraction vane station is located beneath the nozzle floor. The nozzle exit vanes are deployable from a stowed condition laterally outward of the respective first and second sidewalls to an extended condition downstream of the air outlet and laterally inward of the respective first and second sidewalls. The nozzle exit vanes are configured to rotationally move to generate higher angles of dynamic yaw and/or a quick yaw input to capture events such as a passing vehicle or gusting winds. The horizontally oriented vanes are positioned downstream of nozzle contraction vanes and upstream of the nozzle exit vanes. The horizontally oriented vanes are configured to rotationally move to generate up-wash or downwash, including replication of the appropriate pressure deficit that would be experienced by a vehicle while driving in traffic. The horizontally oriented vanes are operably connected to and supported by laterally spaced vertical supports mounted to the nozzle floor. Each vertical support includes a drive mechanism operably connect to the horizontally oriented vanes and configured to vertically move the horizontally oriented vanes relative to the nozzle floor.

BRIEF DESCRIPTION OF THE DRAWINGS

FIG. 30 is an airflow through the wind tunnel in a dynamic yaw condition.

DETAILED DESCRIPTION

The present disclosure relates generally to a turbulence generation system or wind tunnel. Although a wind tunnel has a variety of applications and can be used in virtually any application to test the reaction of a test object to an airflow, it has particular application to the automotive industry for aerodynamic and acoustic testing of vehicle configurations. The phrase "aerodynamic and acoustic testing" of a vehicle or other test object, unless otherwise specified, shall mean setting up, collecting and evaluating climatic and/or airflow and/or acoustic data resulting from positioning the test vehicle in a wind tunnel at applicable airflow speeds. It should, of course, be understood that the description and drawings herein are merely illustrative and that various modifications and changes can be made in the structures disclosed without departing from the present disclosure.

Figure 1:
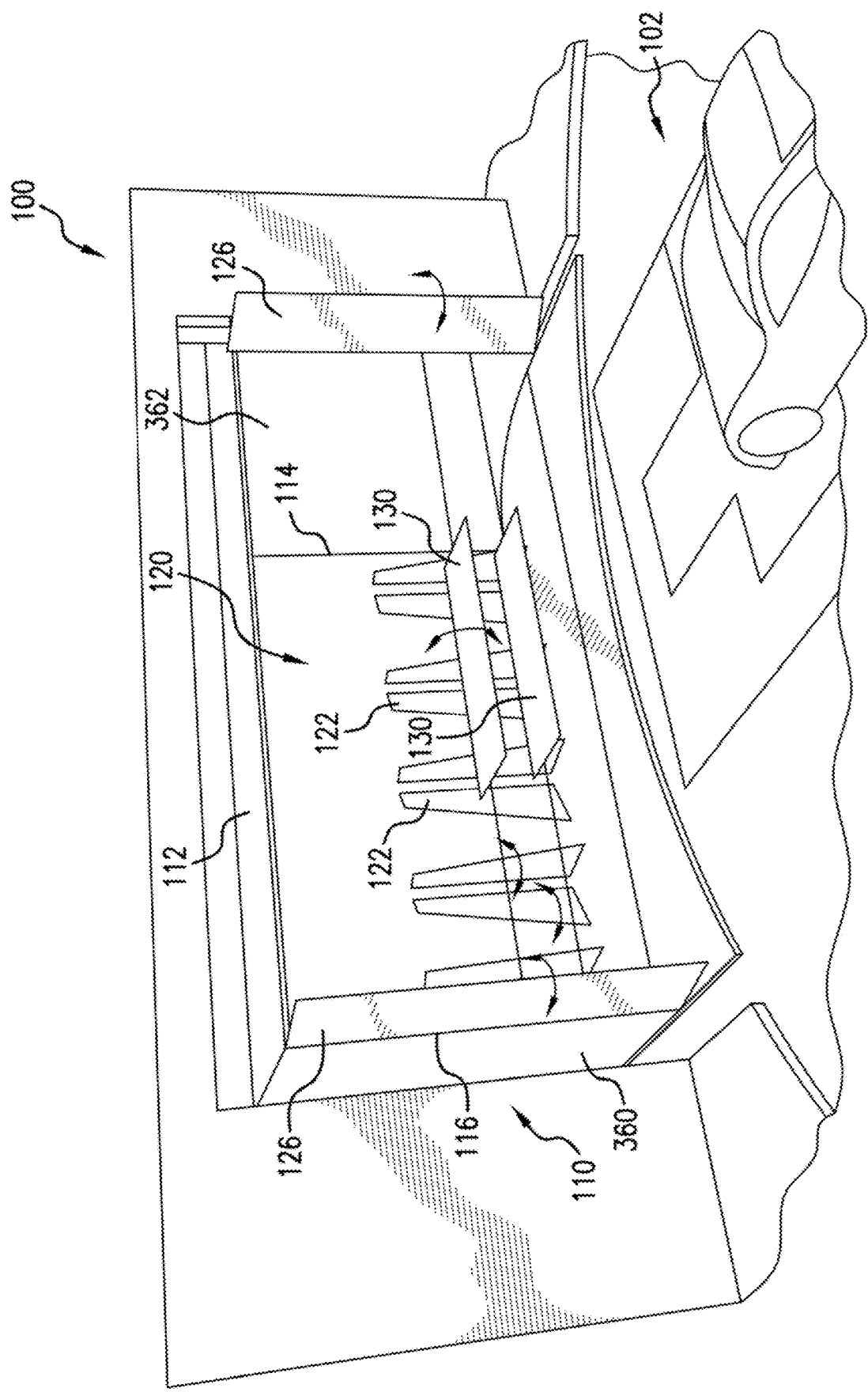
FIG. 1 is a schematic view of a turbulence generation system or wind tunnel according to the present disclosure. The wind tunnel comprises a contraction section including a nozzle and a vane assembly positioned in cooperative relationship with the contraction section to direct airflow from the nozzle.
Figure 2:
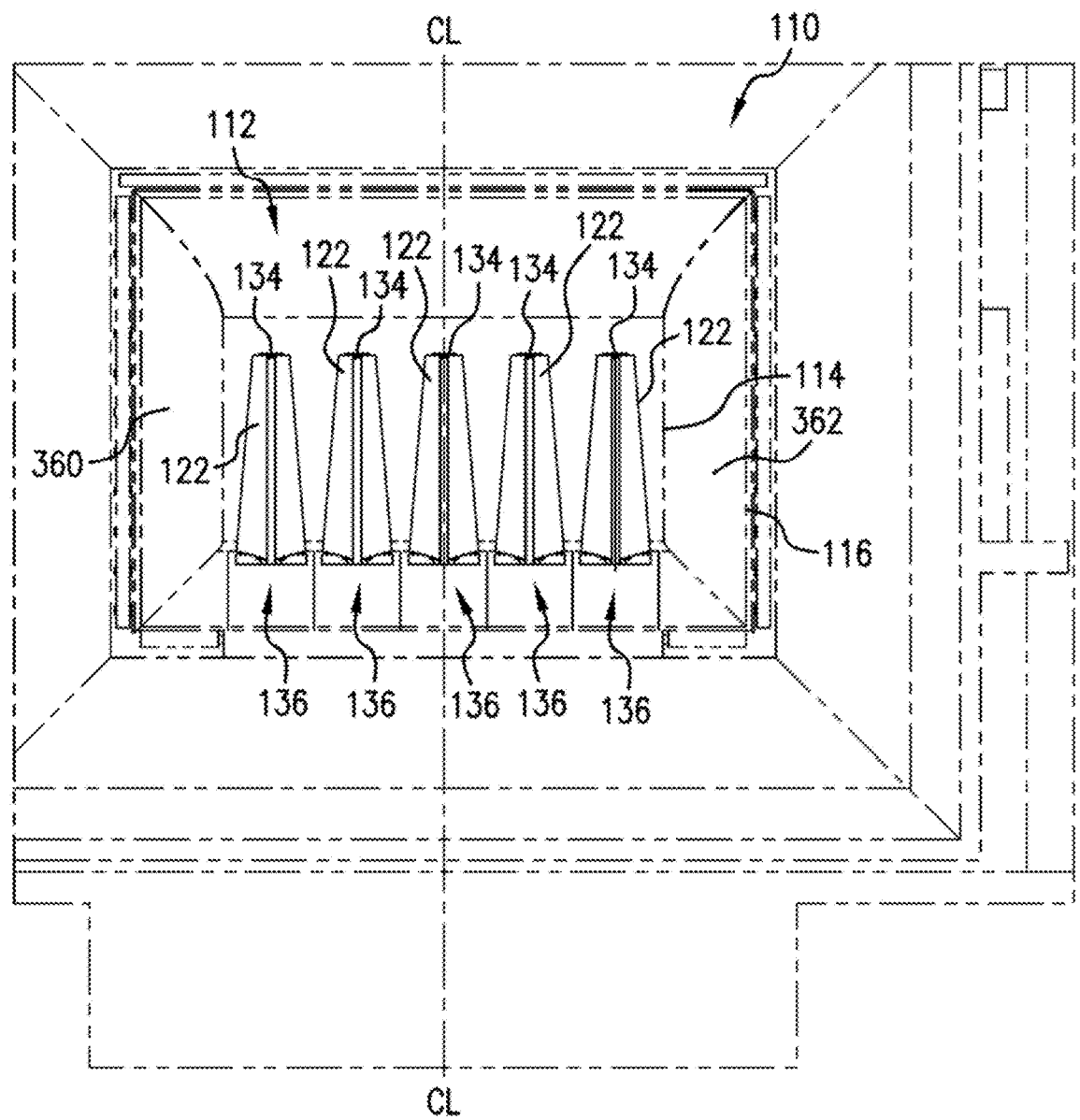
FIGS. 2 and 3 are respective front and top views of a plurality of nozzle contraction vane stations of the vane assembly.
Figure 3:
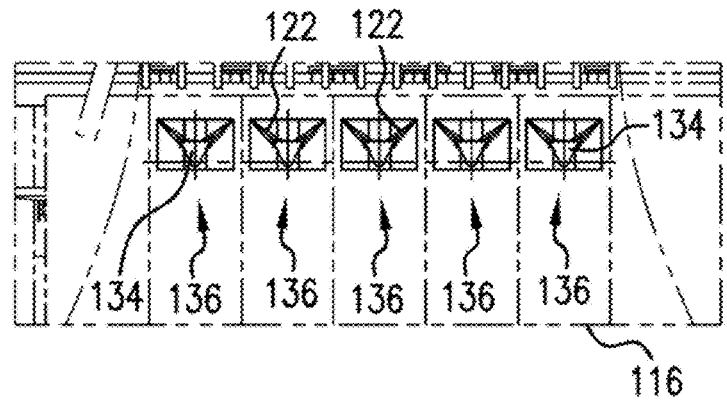

Referring now to the drawings, wherein like numerals refer to like parts throughout the several views, FIG. 1 schematically illustrates a turbulence generation system or wind tunnel 100 according to the present disclosure for use in aerodynamic and acoustic testing of a test vehicle 102 positioned on a test platform 104. The wind tunnel 100 generally comprises a contraction section 110 including a nozzle 112 having an air inlet 114 and an air outlet 116, and a vane assembly 120 positioned in cooperative relationship with the contraction section 110 to direct airflow from the nozzle 112 toward the test vehicle. The vane assembly 120 includes at least two vertically oriented nozzle contraction vanes 122, a pair of vertically oriented nozzle exit vanes 126, and at least one horizontally oriented vane 130. The nozzle contraction vanes 122 are located within the nozzle 112 upstream of the air outlet 116. Each nozzle contraction vane 122 is configured to rotationally move independent of the other nozzle contraction vane to generate airflow pressure loss, turbulence and/or flow vectoring. The nozzle exit vanes 126 are downstream of the air outlet 116 and configured to rotationally move to generate higher angles of dynamic yaw and/or a quick yaw input to capture events such as a passing vehicle or gusting winds. The at least one horizontally oriented vane 130 is positioned downstream of nozzle contraction vanes 122 and upstream of the nozzle exit vanes 126 and configured to rotationally move or remain static once properly positioned to generate up-wash or downwash, including replication of the appropriate pressure deficit that would be experienced by a vehicle while driving in traffic or similar driving condition. It should be appreciated that the nozzle contraction vanes 122, the nozzle exit vanes 126, and the horizontally oriented vane 130 can be selectively used in combination and used individually to generate desired wind conditions.

Figure 4:
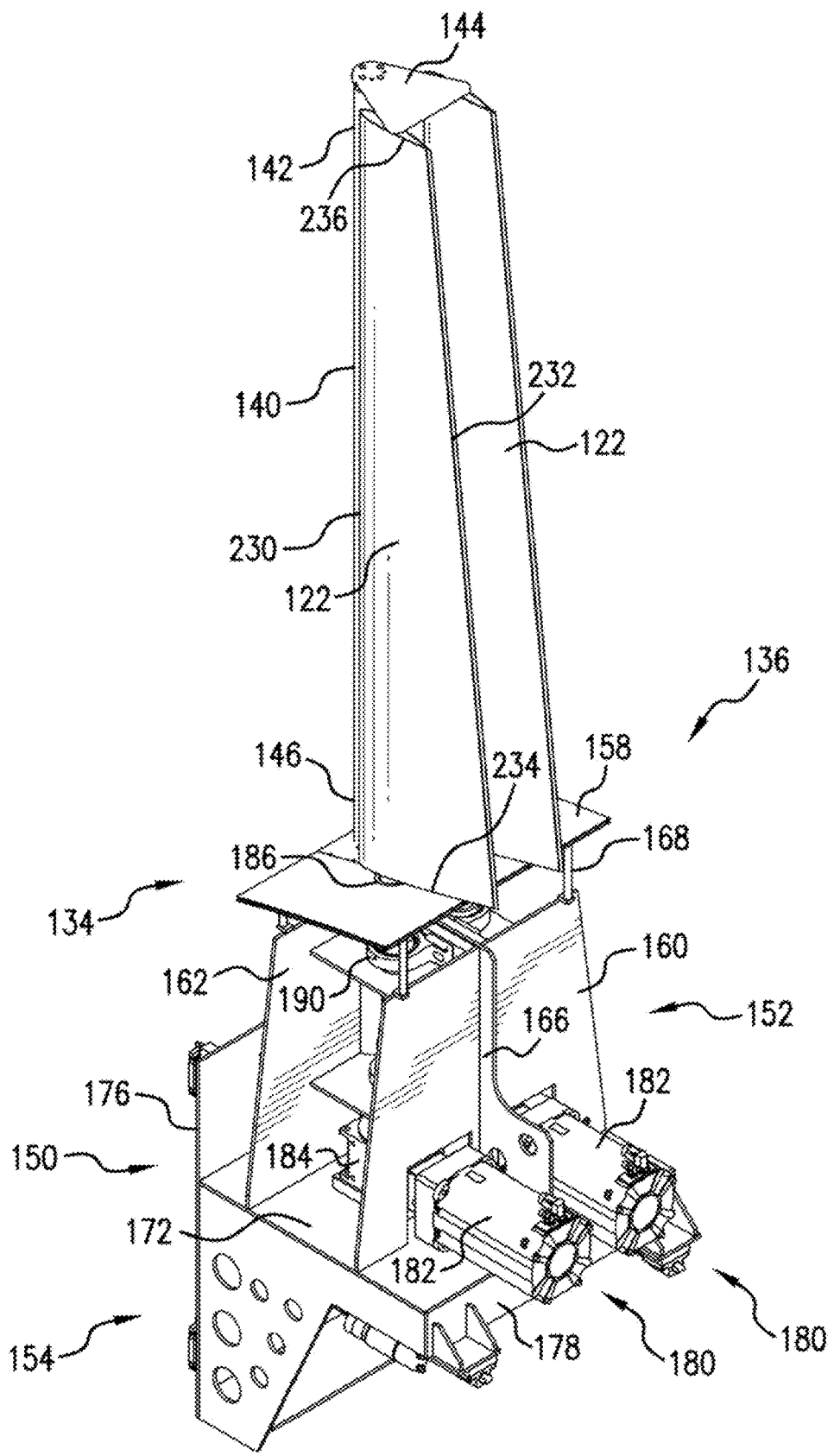
FIG. 4 is a perspective view of one of the nozzle contraction vane stations including nozzle contraction vanes mounted to a common frame assembly.

FIGS. 2-9 illustrate the exemplary features of the at least two nozzle contraction vanes 122. According to the depicted aspect, the at least two nozzle contraction vanes 122 are movably connected to a common frame assembly 134 and together with the frame assembly 134 defines a nozzle contraction vane station 136. In the depicted aspect, the exemplary vane assembly 120 includes a plurality of identically constructed nozzle contraction vane stations 136, which can be equally spaced from one another along a transverse or width direction of the nozzle 112 with one of the nozzle contraction vane stations 136 positioned on a vertical centerline CL of the nozzle 112. It should be appreciated that the equal spacing of the nozzle contraction vane stations 136 allows for full coverage of airflow along the nozzle width and test platform 104. As best depicted in FIG. 4, the frame assembly 134 includes a mast 140 having an upper end portion 142 secured to a mast cap 144 and a lower end portion 146 secured to a carriage 150. The carriage 150 includes an upper assembly 152 and a lower assembly 154. The upper assembly 152 includes a filler plate 158, spaced, parallel support plates 160, 162, and a separating plate 166 transverse to and connecting the support plates 160, 162. The filler plate 158 is mounted to the support plates 160, 162 (for example, by the depicted connecting rods 168), and the support plates 160, 162 are secured to a platform 172 of the lower assembly 154. The lower assembly 154 further includes side walls (only side wall 174 is visible), a back wall 176, and a front wall 178.

Figure 6:
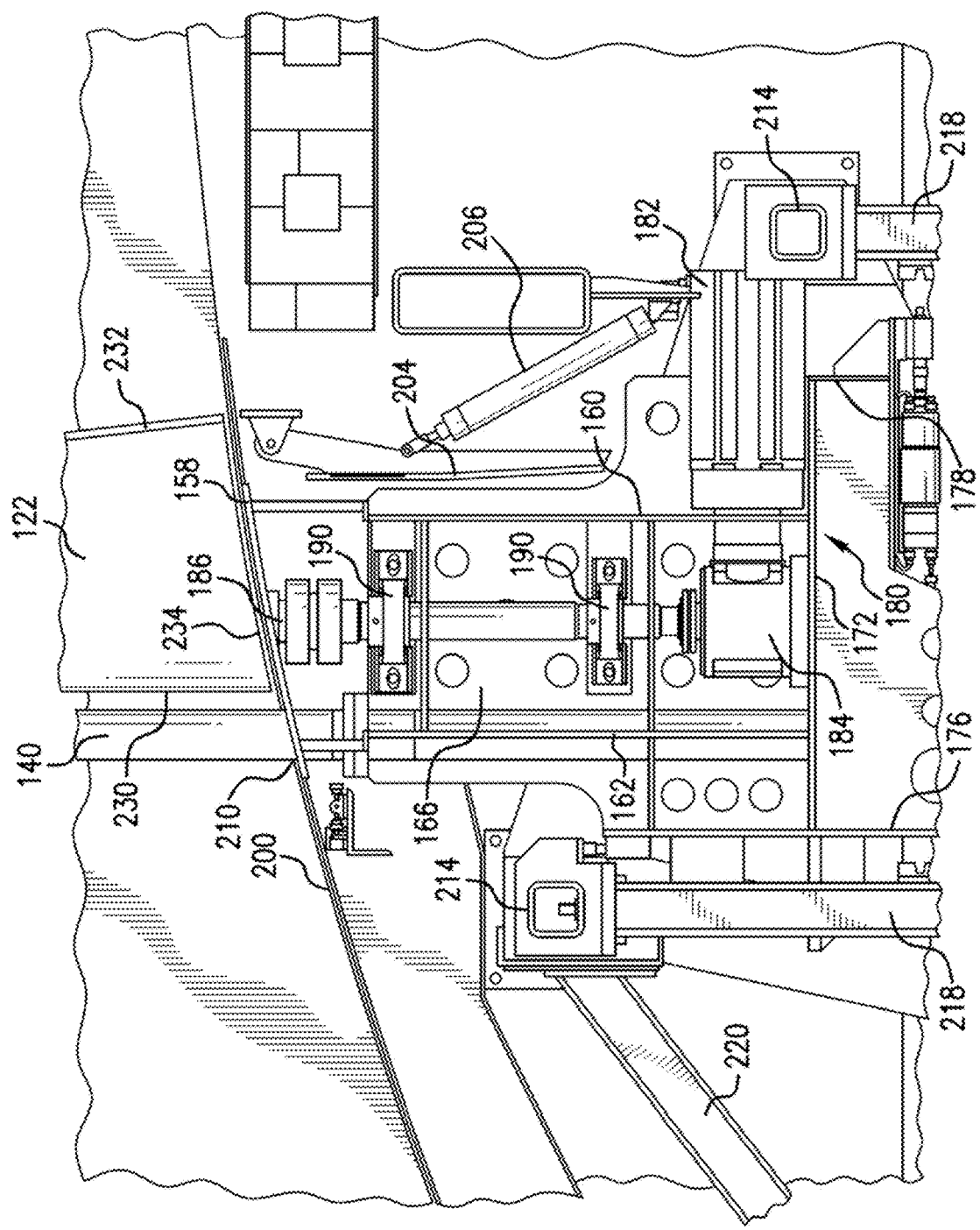
FIG. 6 is a side view of the wind tunnel, partially broken away, depicting one of the nozzle contraction vane stations in an extended, use condition.
Figures 7, 8, 9:
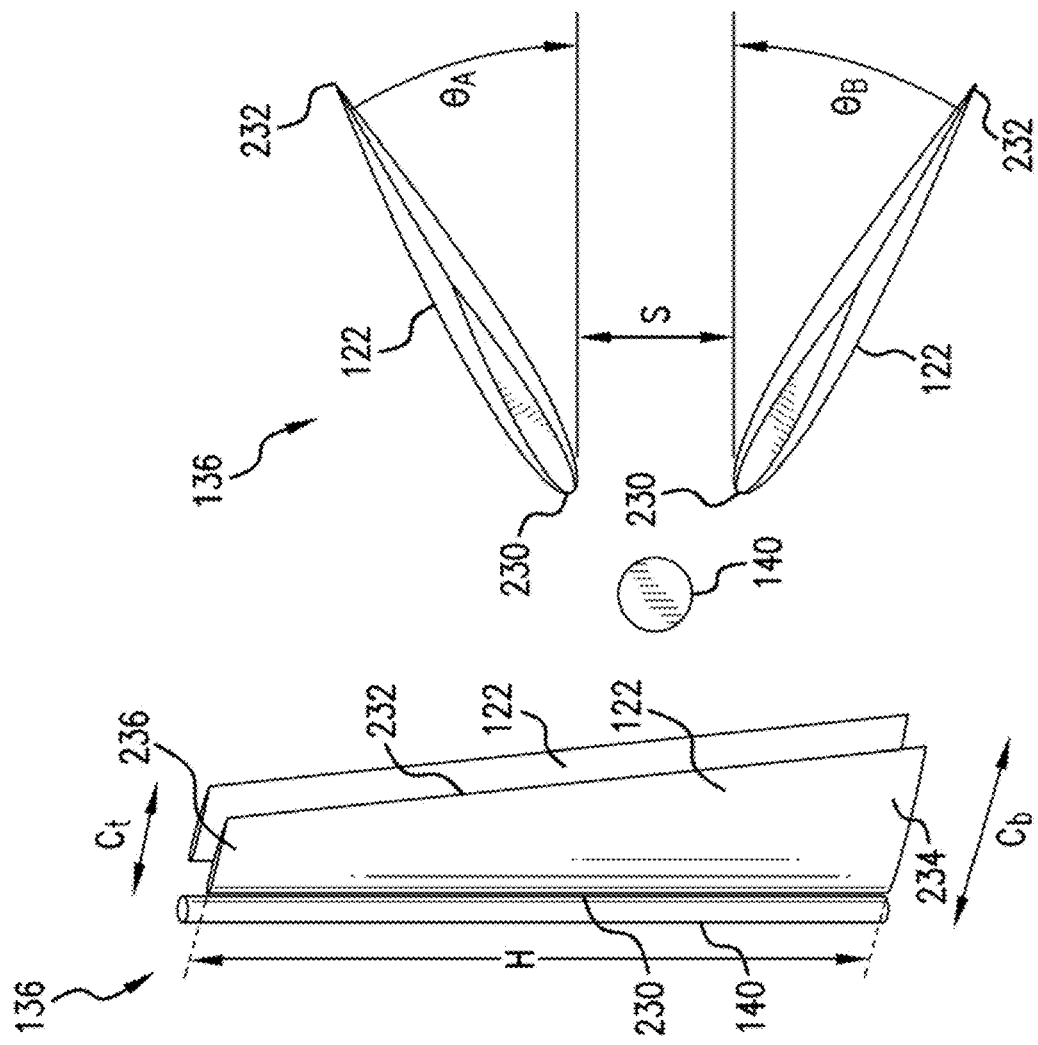
FIGS. 7-9 are schematic views illustrating various dimensions and rotational angles of the nozzle contraction vanes.

As indicated previously, each nozzle contraction vane 122 of each nozzle contraction vane station 136 is configured to rotationally move independent of the other nozzle contraction vane, thereby allowing for in-phase and out of phase sinusoidal motion of the nozzle contraction vanes 122 of each nozzle contraction vane station 136. To this end, separate drive assemblies 180 are provided for each nozzle contraction vane 122. As shown in FIGS. 4 and 6, each drive assembly 180 includes a motor 182 operably connected to a gear box 184 and a rotational shaft or spar 186 operably connected to the gear box 184. The shaft 186, which can be supported by bearings 190 mounted to the separating plate 166, extends from the gear box 184, through the nozzle contraction vane 122, and is rotatably connected to the mast cap 144. Each drive assembly 180 can be further provided with at least one rotary encoder (not shown) configured to detect the rotational position of the nozzle contraction vane 122.

Figure 5:
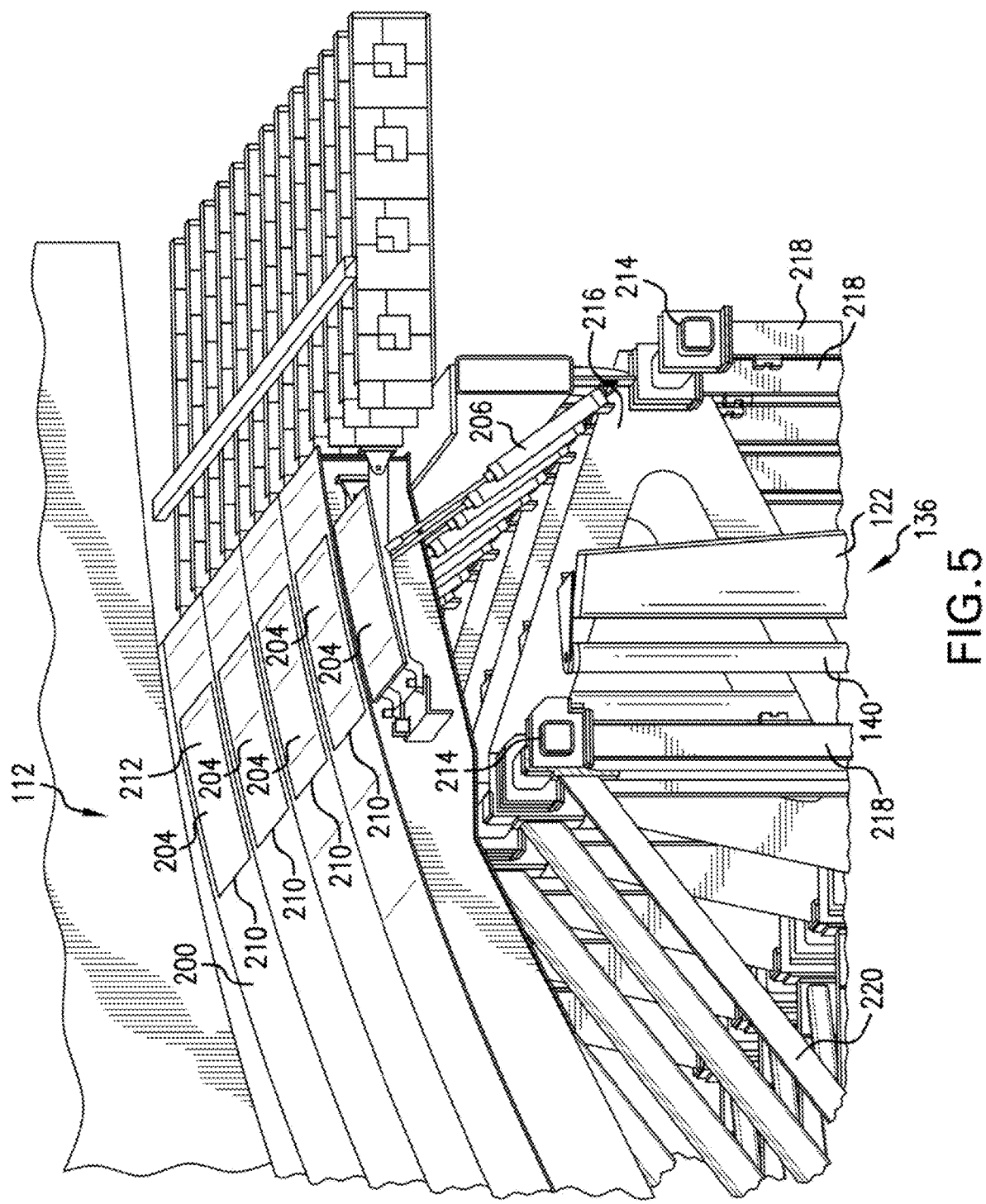
FIG. 5 is a perspective view of the wind tunnel, partially broken away, depicting the nozzle contraction vane stations in a retracted, stowed condition.

With reference to FIGS. 5 and 6, each nozzle contraction vane station 136 is movable between a retracted, stowed condition and an extended, use condition, where in the retracted condition each nozzle contraction vane station 136 is located beneath a floor 200 of the nozzle 112. Further, each nozzle contraction vane station 136 is movable between the retracted condition and the extended condition independent of the other nozzle contraction vane stations. To allow for this movement, the nozzle floor 200 is provided with trap doors 204, each trap door 204 being independently movable via a piston 206 between a closed position for covering an opening 210 in the nozzle floor and an open position. In the closed position, a top surface 212 of each trap door 204 is contoured to match the sloping surface of the nozzle floor 200. The pistons 206 are connected to supporting structure beneath the nozzle floor. By way of example, the supporting structure can include header beams 214 which span in the width direction of the nozzle 112, plate braces 216 interconnecting the header beams 214 for separating the nozzle contraction vane stations 136, columns 218 for supporting the header beams 214, and cross braces 220 secured to one of the header beams. It should be appreciated that a lift assembly (not shown) for each carriage 150 is provided beneath the nozzle floor 200, the lift assembly adapted to vertically move the nozzle contraction vane station 136.

With reference to FIGS. 6-9, each nozzle contraction vane 122 can be a symmetric airfoil (for example, NACA 0012 airfoil profile) having a leading edge 230, a trailing edge 232, a base or root 234 defining a root chord $C_b$, and a tip 236 defining a tip chord $C_t$. Although, it should be appreciated that at least one of the nozzle contraction vanes 122 can be an asymmetrical shape for certain testing configurations. In the depicted aspect, the tip chord is dimensioned smaller than the root chord, and according to one aspect, the tip chord is approximately one-half the root chord. The height H of each nozzle contraction vane 122 is set to be equal to or greater than a height of the test vehicle 102. Further, a pivot location as defined by the shaft 186 for each nozzle contraction vane 122 is offset from the leading edge 230 a predetermined distance which allows for higher frequencies as compared to a pivot location at the leading edge 230. The nozzle contraction vanes 122 of each nozzle contraction vane station 136 are spaced apart a predetermined distance S (e.g., about 100 mm) to allow for the independent rotation of the nozzle contraction vanes 122. In addition, in FIG. 9, the nozzle contraction vane station 136 are spaced upstream of the nozzle air outlet 116 to improve dynamic yaw performance. According to one aspect, the nozzle contraction vane station 136 are aligned in the width direction of the nozzle 112, and a spacing D from the aligned masts 140 to a nozzle exit plane NEP is about 4000 mm to 4400 mm. Further, in FIG. 6, in the extended condition of each nozzle contraction vane station 136, a lower part of the frame assembly 134, specifically the filler plate 158, is positioned substantially flush with the nozzle floor 200 to close the opening 210, and a lower end of each nozzle contraction vane 122, specifically the root 234, is shaped to match a contour of the nozzle floor 200. This arrangement of the filler plate 158 and root 234 prevents the formation of vortices at the lower ends of the nozzle contraction vanes.

Figure 10:
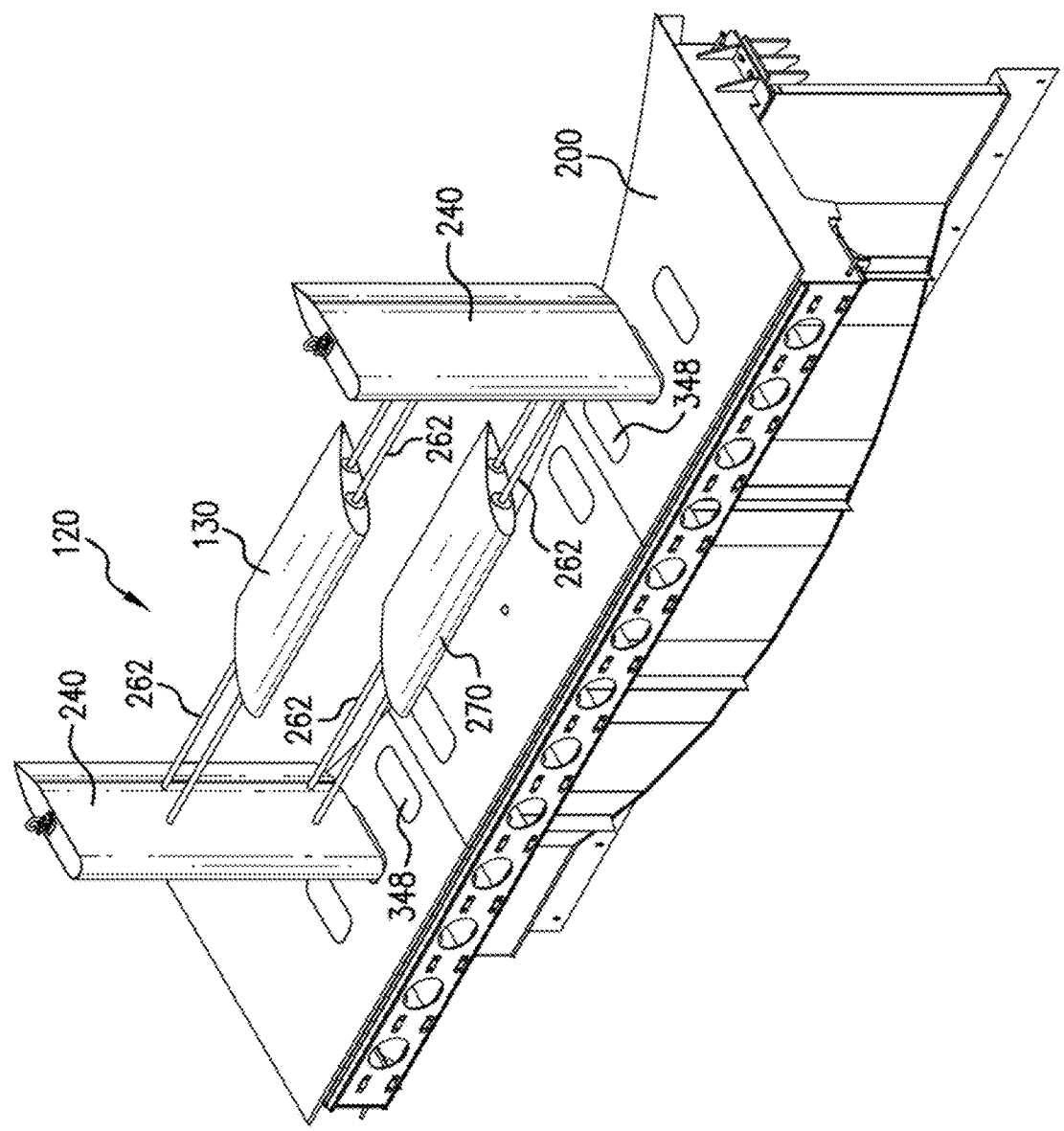
FIG. 10 is a perspective view of the wind tunnel, partially broken away, depicting a pair of horizontally oriented vanes of the vane assembly secured to vertical supports mounted to a nozzle floor.
Figure 11:
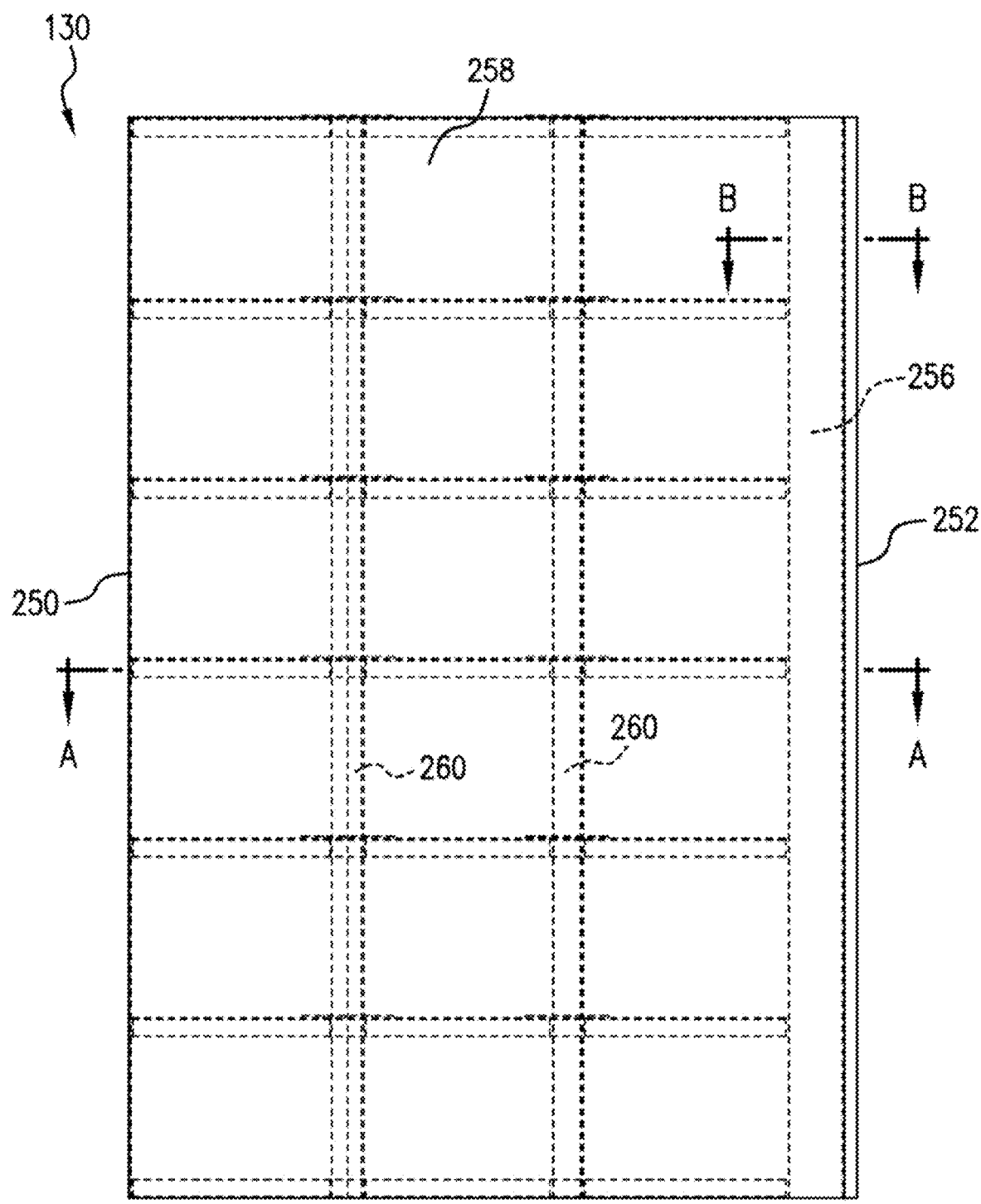
FIG. 11 is a top view of one of the horizontally oriented vanes.
Figure 12:
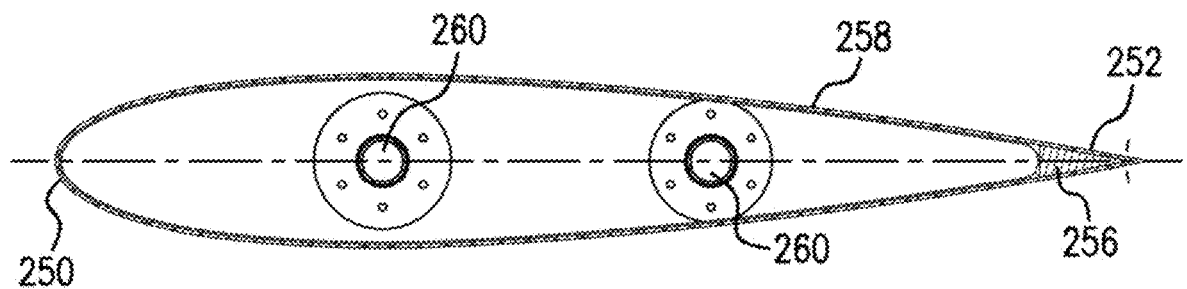
FIGS. 12 and 13 are cross-sectional views taken alone lines A-A and B-B, respectively, of FIG. 11.
Figure 13:
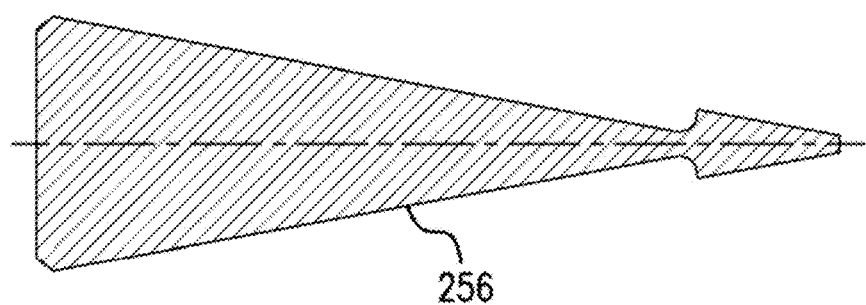

FIGS. 10-13 illustrate the exemplary features of the at least one horizontally oriented vane 130 and its corresponding laterally spaced vertical supports 240 which are mounted to the nozzle floor 200. The depicted horizontally oriented vane 130 can be a high lift non-symmetric airfoil (for example, a NACA 0012 airfoil profile or a NACA 0016 airfoil profile) having a leading edge 250, a trailing edge 252, and is dimensioned to have a chord ranging from 600 mm to 1000 mm and a span ranging from 1000 mm to 3500 mm. According to one aspect, the trailing edge 252 includes a separate wedge section 256 which is secured in place by an outer skin 258. A pair of bores 260 extend through the horizontally oriented vane 130 and are sized to receive a pair of slider rods 262 which couple the horizontally oriented vane 130 to the vertical supports 240. The slider rods 262 allow the horizontally oriented vane 130 to be positioned laterally along the slider rods 262 between the vertical supports 240. As shown, the horizontally oriented vane 130 is an upper or first horizontally oriented vane, and the vane assembly 120 includes a lower or second horizontally oriented vane 270 also coupled to the vertical supports 240 via another pair of slider rods 262. According to one aspect, and as depicted in FIG. 10, the lower horizontally oriented vane 270 is similar in shape to the upper horizontally oriented vane 130. According to another aspect, and as depicted in FIGS. 17-20, the lower horizontally oriented vane 270 differs in shape from the upper horizontally oriented vane 130. In this aspect, the lower horizontally oriented vane 270 has a leading edge 272, a trailing edge 274, opposite side sections 276, 278 and a central section 280. Each of the side sections 276, 278 can be a symmetric airfoil, the side sections defining a first angle of attack θ relative to the airflow. The central section 280 extends below the side sections and defines a second angle of attack $θ_1$ relative to the airflow that differs from the first angle of attack. According to one embodiment, the first angle of attack is about 30° and the second angle of attack is about 14°. The lower horizontally oriented vane 270 having the variable angle of attack in conjunction with the upper horizontally oriented vane 130 is effective at generating targeted vorticity and up-wash profiles, reproducing in the wind tunnel 100 a flow condition similar to one on-road vehicle following another on-road vehicle.

Figure 14:
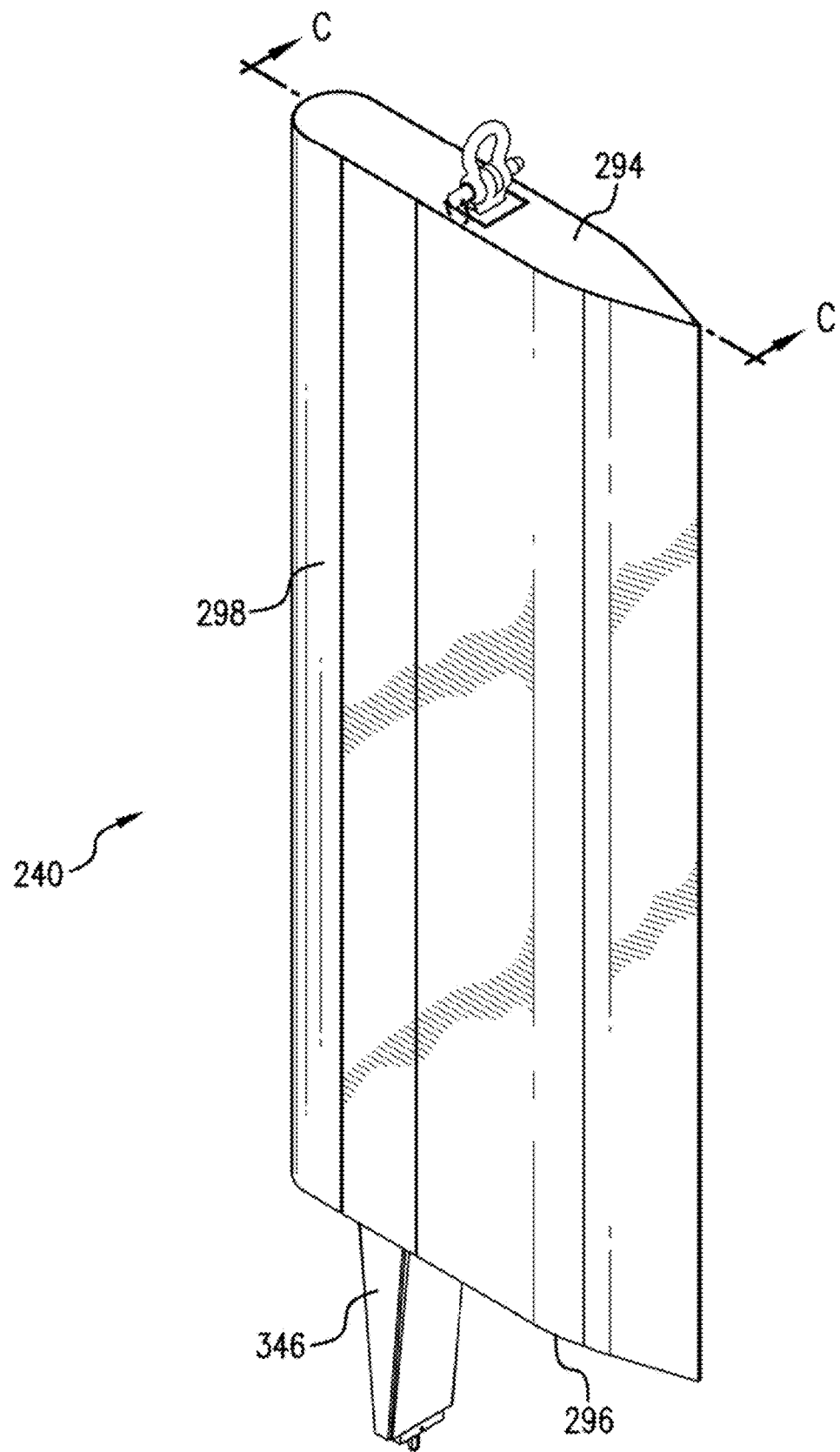
FIG. 14 is a perspective view of one of the vertical supports.
Figure 15:
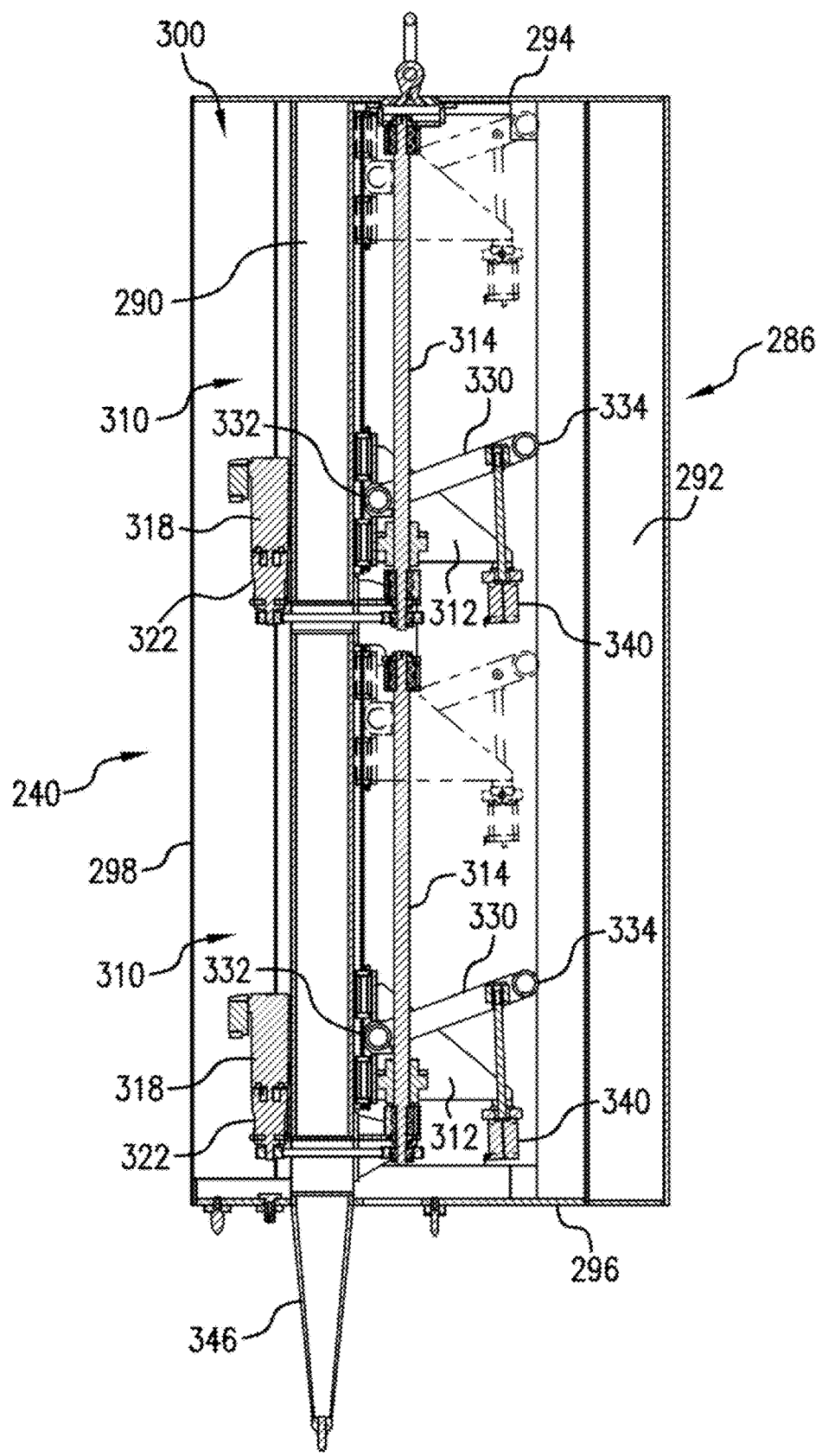
FIG. 15 is a cross-sectional view taken alone lines C-C of FIG. 14.
Figure 16:
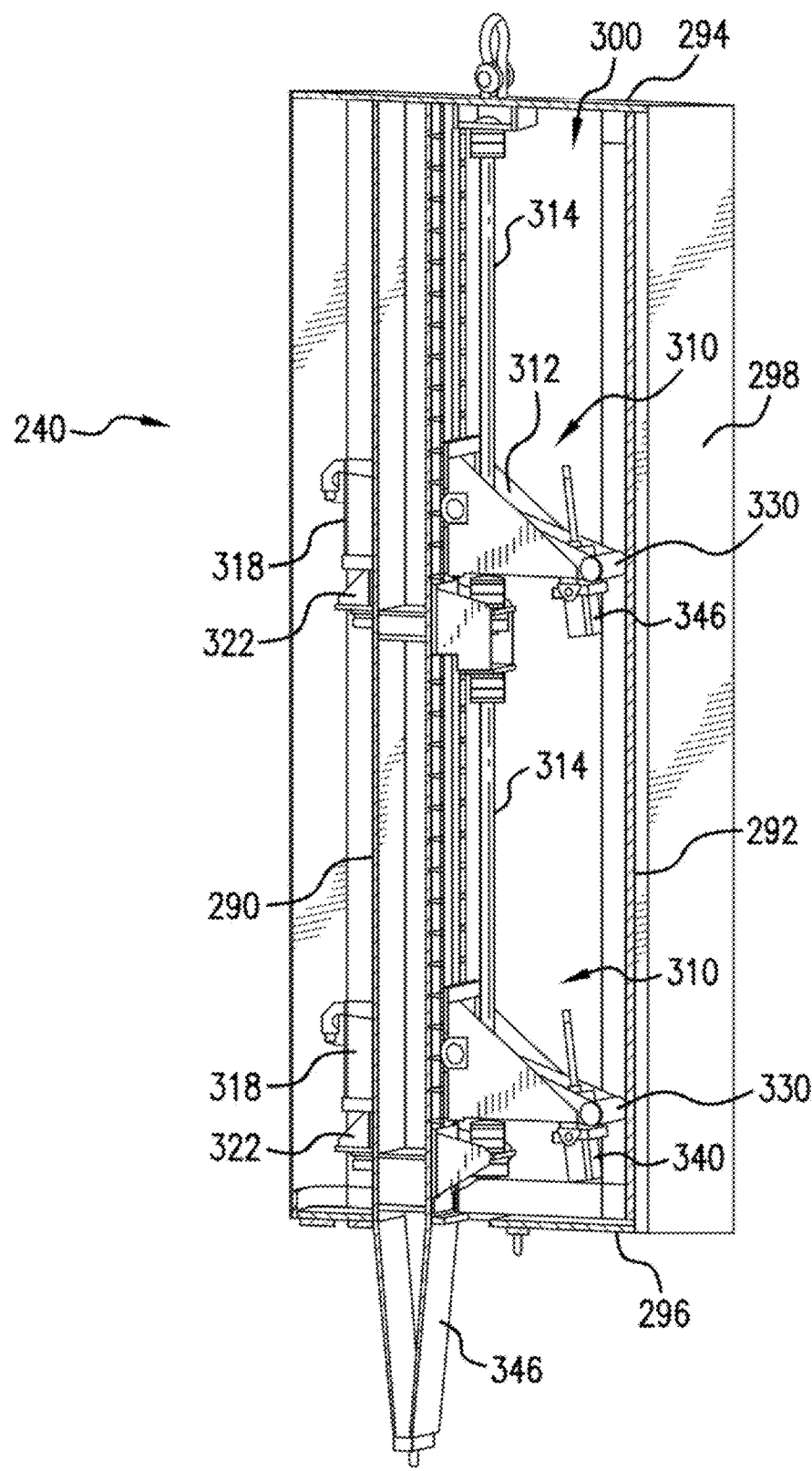
FIG. 16 is a perspective cross-sectional view of FIG. 14.
Figure 17:
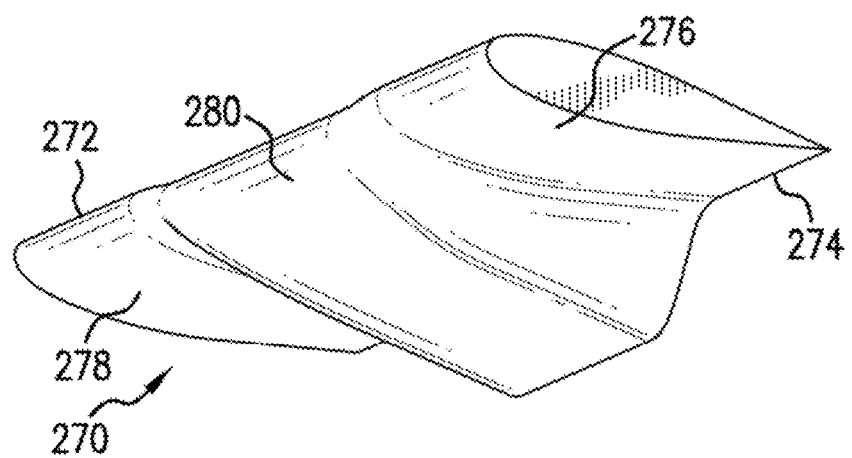
FIGS. 17-20 are views of an alternative configuration of a horizontally oriented vane.
Figure 18:
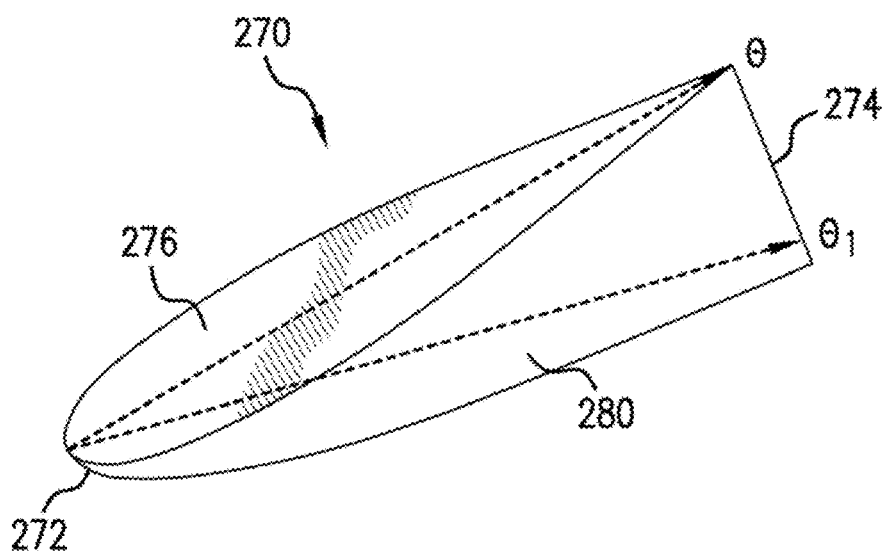
Figure 19:
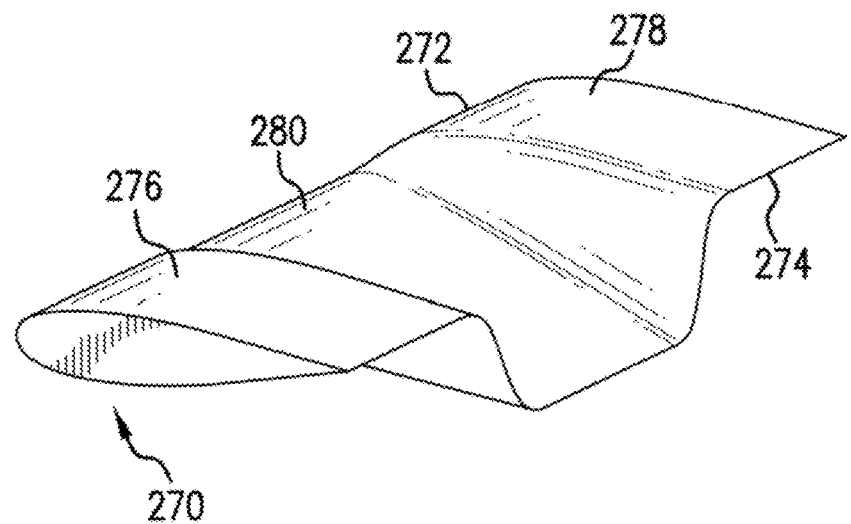
Figure 20:
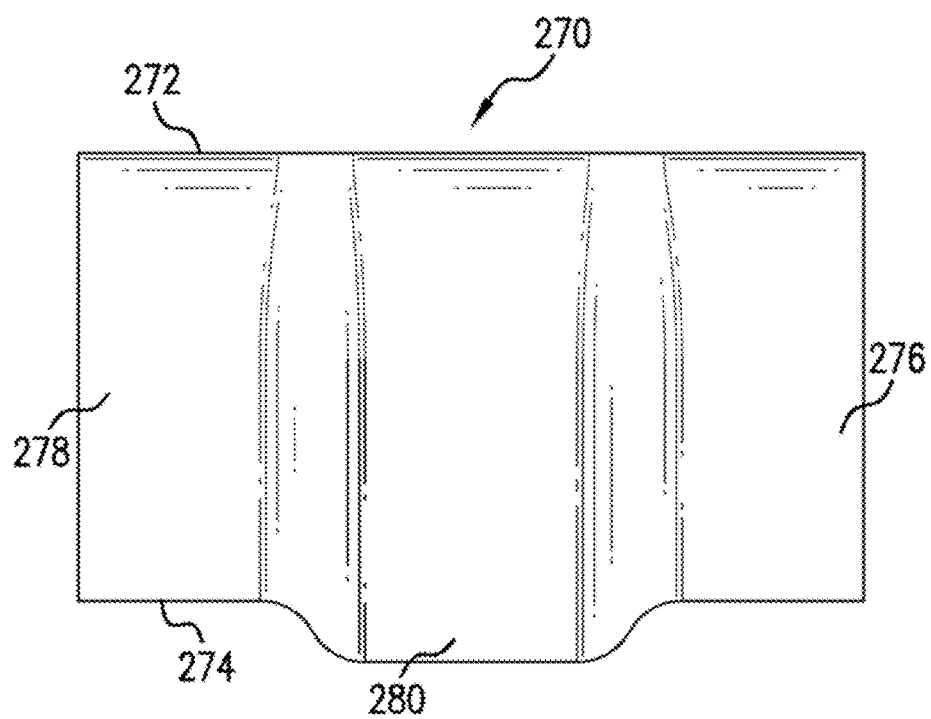
Figure 21:
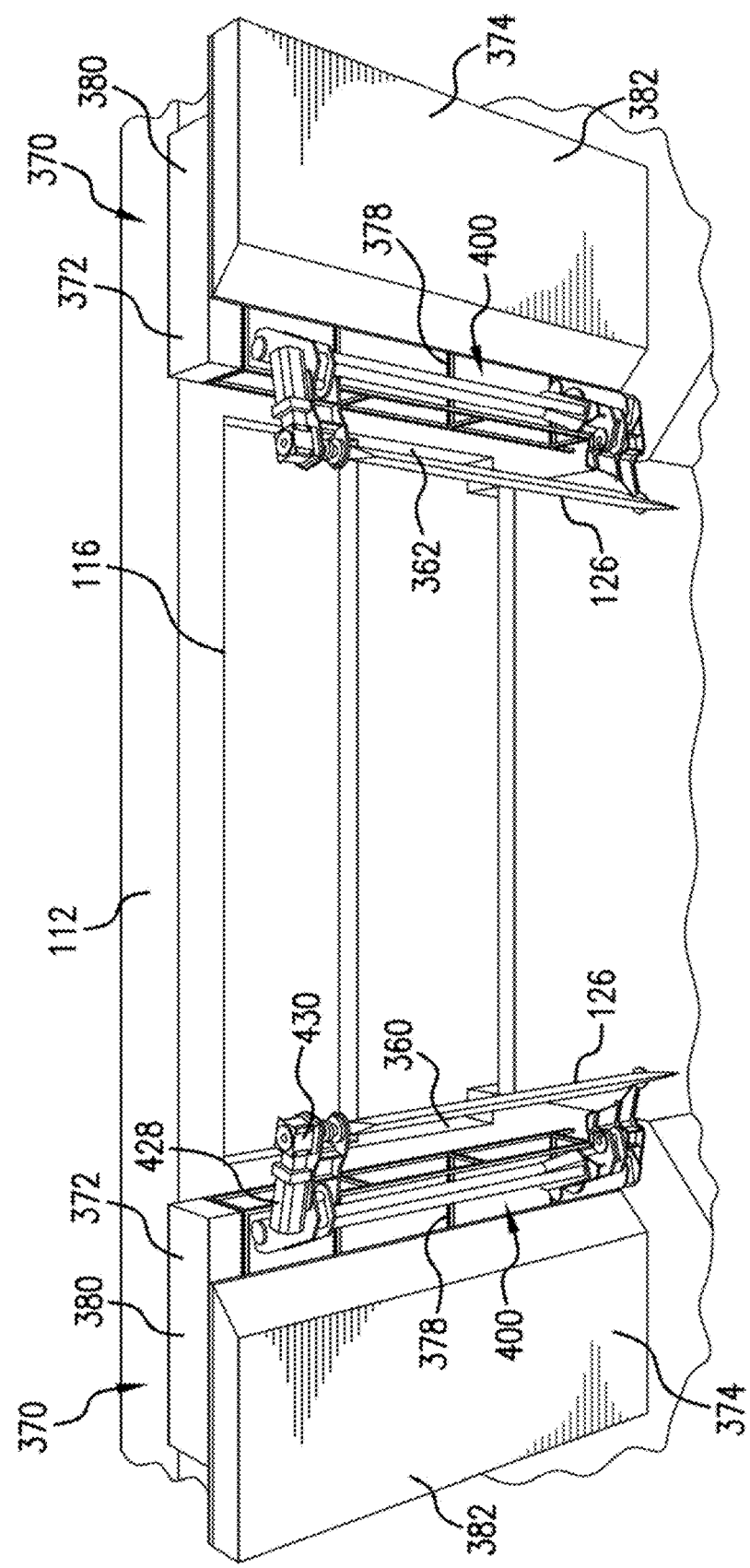
FIG. 21 is a perspective view of a pair nozzle exit vane assemblies of the vane assembly, each nozzle exit vane assembly including a vertically oriented nozzle exit vane, a deployment mechanism, and a cabinet assembly.
Figure 22:
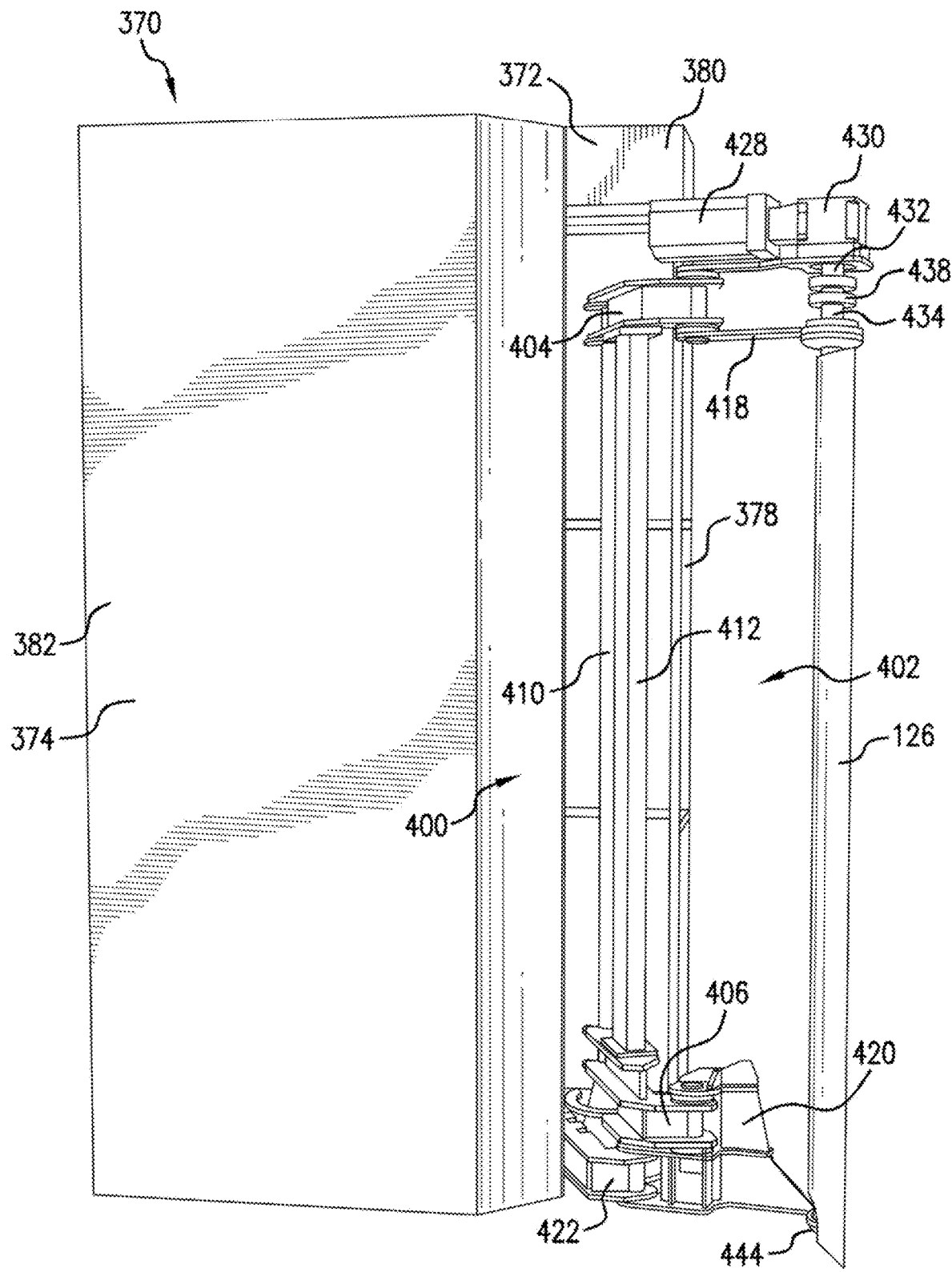
FIG. 22 is a perspective view of one of the nozzle exit vane assemblies.
Figure 23:
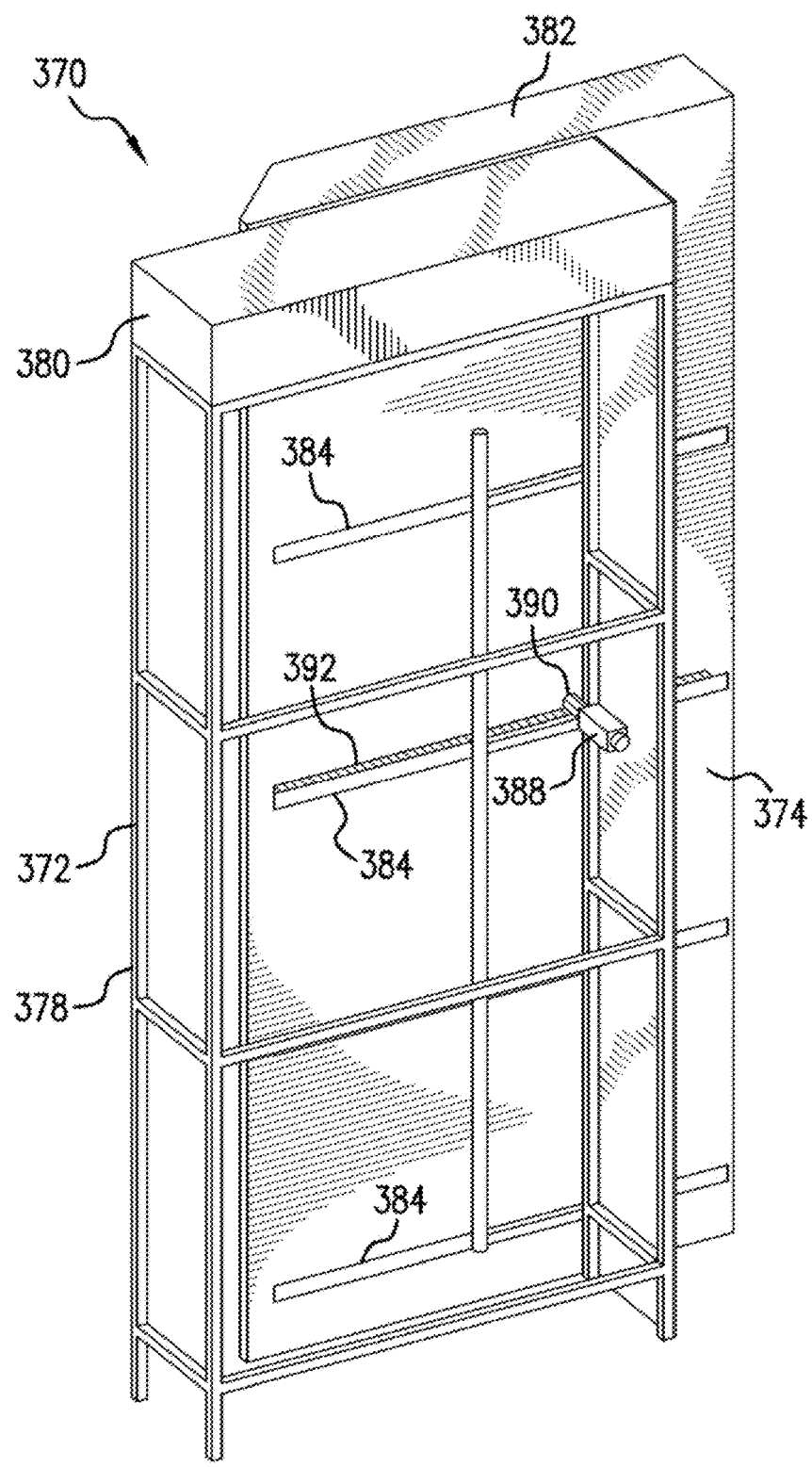
FIG. 23 is a perspective view of the cabinet assembly.
Figure 24:
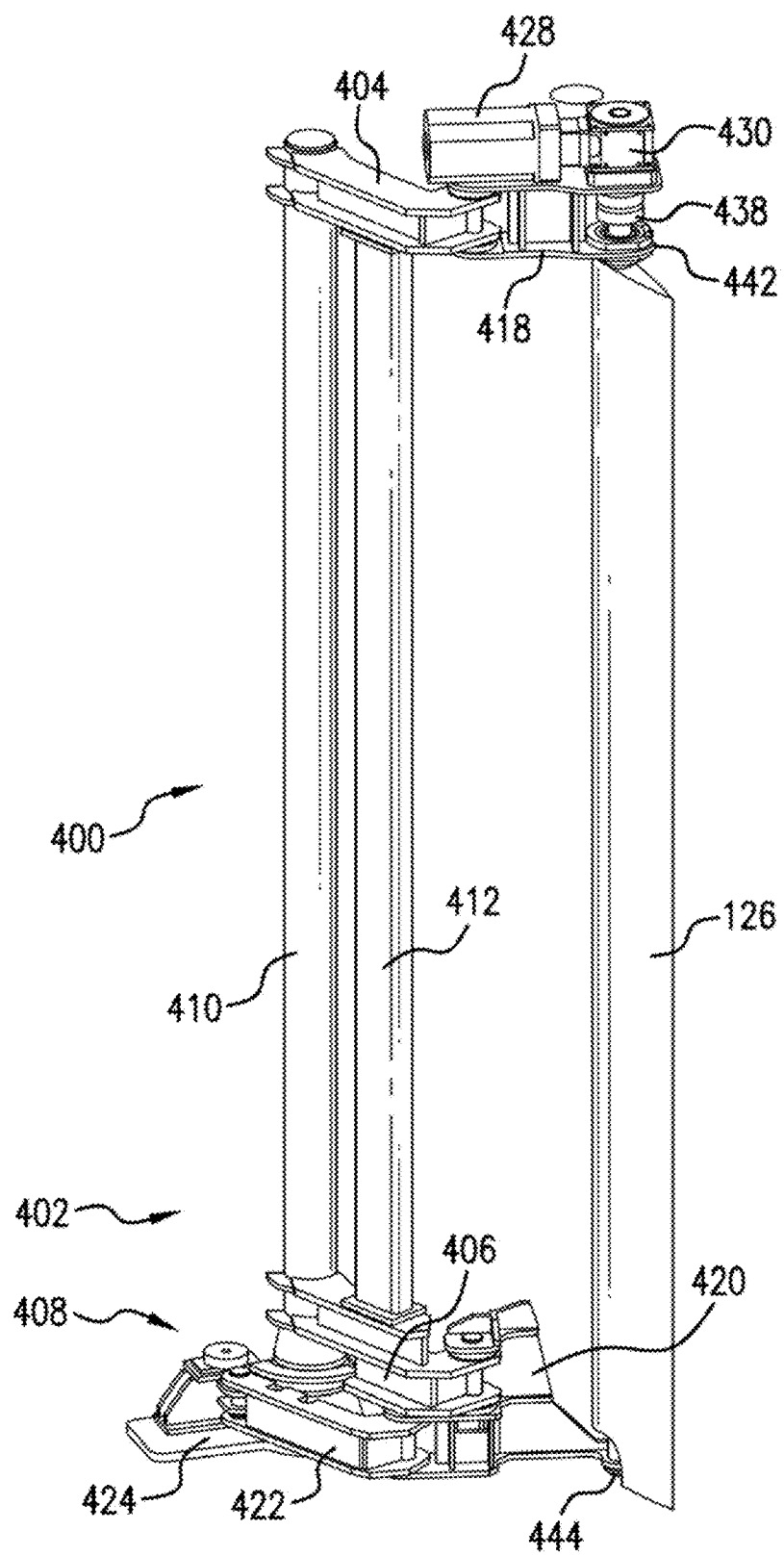
FIG. 24 is perspective view of one of the nozzle exit vane and deployment mechanism.

FIGS. 14-16 depict the exemplary features of the vertical supports 240 which support the horizontally oriented vanes 130, 270. Each vertical support 240, which can be airfoil shaped in top view, includes a supporting structure 286 (for example, a weldment) having columns 290, 292 interconnecting upper and lower plates 294, 296. An outer skin 298 is attached to the weldment 286 and defines an enclosure 300. The horizontally oriented vanes 130, 270 are each configured to be selectively movable a vertical direction relative to the nozzle floor 200, and each vertical support 240 includes a drive mechanism 310 operably connect to each horizontally oriented vane 130, 132. The drive mechanisms 310 housed in the enclosure 300 are configured to independently vertically move the horizontally oriented vane 130, 270. According to the depicted embodiment, each drive mechanism 310 includes a carriage 312 operably connected to a vertically extending screw drive 314 via a screw nut 316 threaded onto the screw drive. The screw drive 314 is rotatably driven by a motor 318. The screw drive 314 and the motor 318 are connected to brackets 322 attached to the column 290 of the weldment 286. A swing arm 330 pivotally connected to the carriage 312 includes a first end 332 fixed to the carriage and a free second end 334. Each of the first and second ends 332, 334 are configured to receive the slider rods 262. An angle control motor 340 mounted to the carriage 312 is operably connected to the swing arm 330 for pivotally moving the free second end 334 of the swing arm 320. Accordingly, the carriage 312 vertically translates the horizontally oriented vane, and the swing arm 320 together with the angle control motor 330 adjusts the angle of incidence of the horizontally oriented vane. According to the present disclosure, the angular range of each horizontally oriented vane 130, 270 is about minus 40° (up-wash) to about positive 20° (downwash). As indicted, the vertical supports 240 are mounted to the nozzle floor 200, and depending from each weldment 286 is an attachment member 346. The attachment member 346 is securely received in a socket 348 provided on the nozzle floor 200 (FIG. 10). As depicted, the nozzle floor 200 is provided with plurality of sockets 348, which allows for selective adjustment of the horizontally oriented vanes 130, 270 in the width direction of the nozzle 112.

With reference to FIGS. 21-24, one of the nozzle exit vanes 126 is positioned laterally inward from a first sidewall 360 of the nozzle 112 and the other nozzle exit vane 126 is positioned laterally inward from a second sidewall 362 of the nozzle 112 which is laterally spaced from the first sidewall. Each nozzle exit vanes 126 is associated with and housed in an acoustic cabinet assembly 370. The acoustic cabinet assembly 370 includes a cabinet 372 and cover 374 downstream of the cabinet 372 that is slidable between a closed position for covering a cabinet opening and an open position allowing for deployment of the nozzle exit vane 126. The cabinet 372 includes a frame 378 with an upper part lined with an acoustic liner 380. The cover 374 can also be lined with an acoustic liner 382. The cover 374 is movable relative to the cabinet 372 via cover slides 384 coupled to the frame 378 and a drive mechanism. According to the depicted aspect, the drive mechanism includes a motor 388 mounted to the frame 378, and the motor rotationally drives a pinion 390 that is meshingly engaged to a rack 392 provided on the cover 374.

Figure 25:
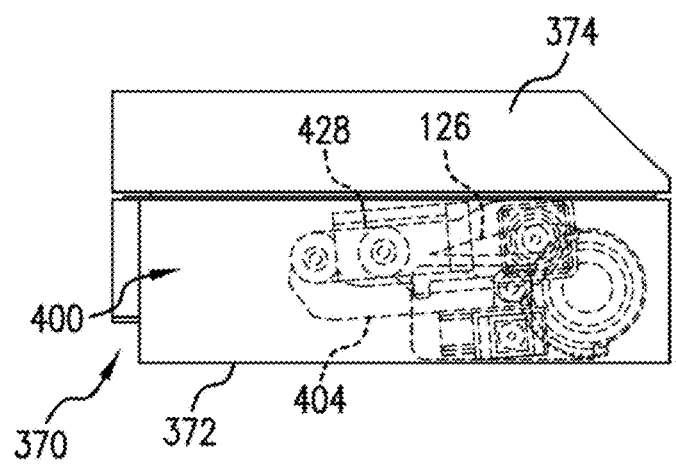
FIGS. 25-27 depict one of the nozzle exit vanes being deployed from a stowed condition to an extended condition.
Figure 26:
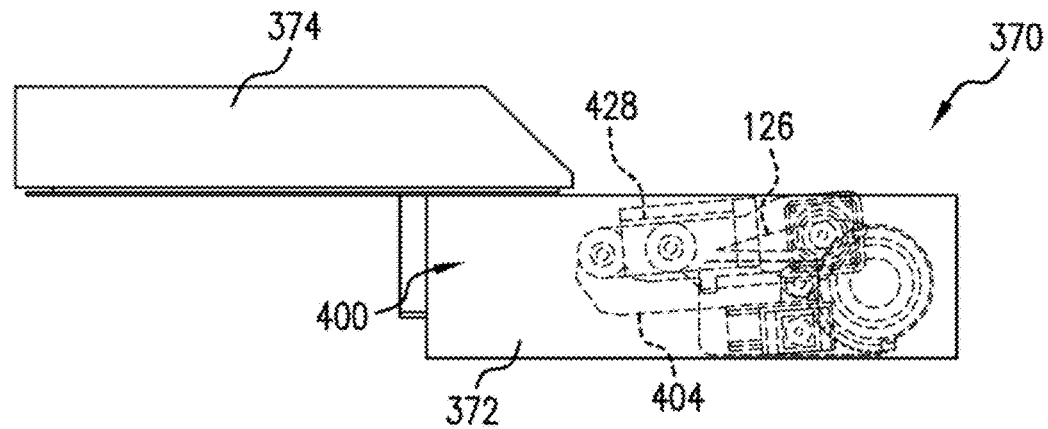
Figure 27:
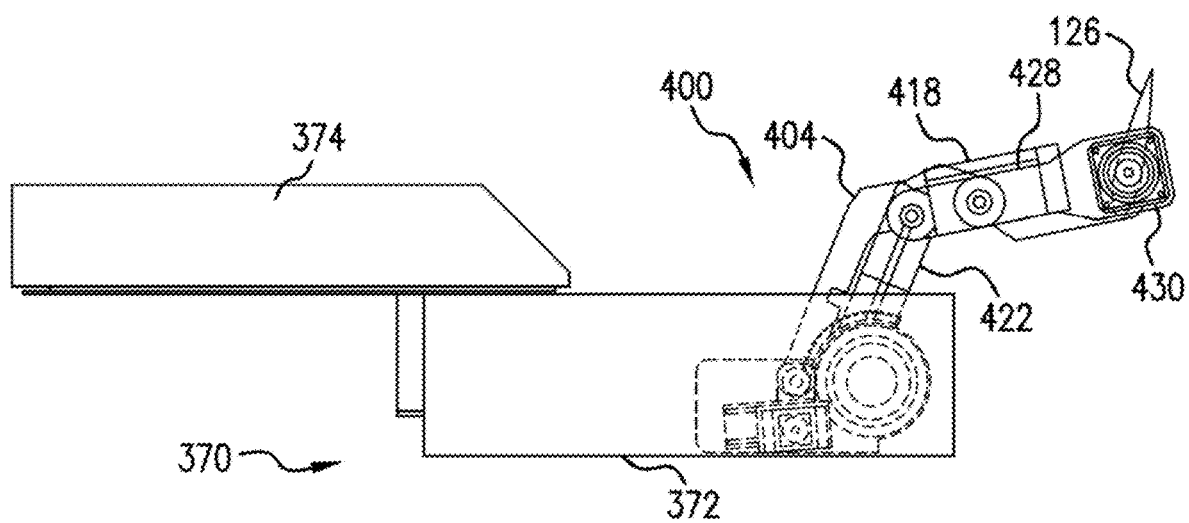

The acoustic cabinet assembly 370 further includes a deployment mechanism 400 operably connected to the nozzle exit vane 126 and configured to move the nozzle exit vane between a retracted, stowed condition and an extended, use condition. In the retracted condition the nozzle exit vane 126 together with the deployment mechanism 400 is housed in the acoustic cabinet assembly 370. As depicted, the deployment mechanism 400 includes a jib assembly 402 having an upper jib linkage 404 and a lower jib linkage 406. The lower jib linkage 406 is moved via a jib drive assembly 408. A vertical support 410 and a linkage brace 412 interconnect the upper jib linkage 404 and the lower jib linkage 406. The upper jib linkage 404 is hinged to an upper vane linkage 418 and the lower jib linkage 406 is hinged to a lower vane linkage 420. Further connected to the lower vane linkage 420 is a deployment linkage 422 which is also connected to a lower jib weldment 424 secured to the vertical support 410. The upper and lower vane linkages 418, 420 rotatably support the nozzle exit vane 126. The nozzle exit vane 126 is driven by a motor 428 coupled to a gearbox 430, both of which are mounted to the upper vane linkage 418. A stub shaft 432 transmits torque from the gearbox 430 to a rotational shaft or spar 434 of the nozzle exit vane 126 via a coupling 438. As depicted, the rotational shaft 434 is supported by upper and lower bearings 442, 444 coupled to the upper and lower vane linkages 418, 420. Once deployed to the extended, use condition, the upper and lower vane linkages 418, 420 can be pinned to the upper and lower jib linkages 404, 406, and the upper and lower jib linkages 404, 406 can be pinned to ground. FIGS. 25-27 depict the deployment of the nozzle exit vane 126 from the retracted, stowed condition to the extended, use condition.

Figure 28:
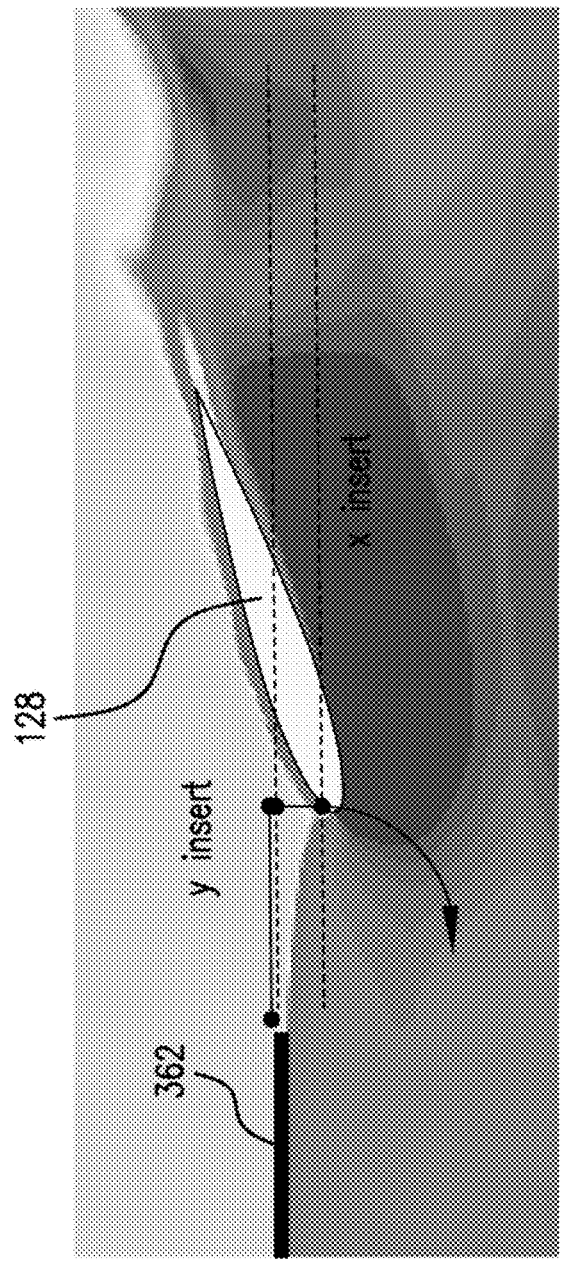
FIGS. 28 and 29 are schematic views illustrating position and rotational angles of one of the nozzle exit vanes.
Figure 29:
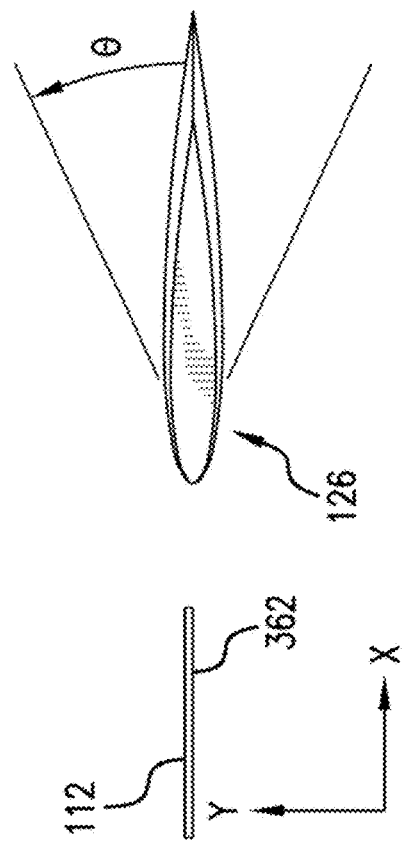

With reference to FIGS. 28 and 29, each nozzle exit vane 126 can be a symmetric airfoil (for example, NACA 0018 airfoil profile); although, it should be appreciated that at least one of the nozzle exit vanes 126 can be an asymmetrical shape for certain testing configurations. Each nozzle exit vane 126 is positioned laterally inward of the respective first and second sidewalls 360, 362 (i.e., the x insert in FIG. 28) a distance of approximately a chord of the nozzle exit vane 126 to maintain airflow attachment to the nozzle exit vane 126 throughout dynamic yaw motion of the nozzle exit vane 126. This positioning is also outside of the core jet to avoid a direct wake on the test vehicle from the nozzle exit vane 126. Further, each nozzle exit vane 126 is positioned downstream of the nozzle air outlet (i.e., the y insert in FIG. 28) a distance of three to five times the chord of the nozzle exit vane 126 to further maintain airflow attachment to the nozzle exit vane (i.e., the outboard side of the nozzle exit vane) throughout dynamic yaw motion of the nozzle exit vane. FIG. 29 depicts the rotational angle θ of the nozzle exit vane 126. When rotate about their vertical axes, the nozzle exit vanes 126 create turbulence which simulates non-steady flow conditions observed by on-road vehicles (FIG. 30).

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention clamied is:
1. A turbulence generation system for use in aerodynamic and acoustic testing of a vehicle comprising:
 a contraction section including a nozzle having an air inlet and an air outlet; and
 a vane assembly positioned in cooperative relationship with the contraction section to direct airflow from the nozzle, the vane assembly including:
  at least two vertically oriented nozzle contraction vanes located within the nozzle upstream of the air outlet, each nozzle contraction vane is configured to rotationally move independent of the other nozzle contraction vane to generate airflow pressure loss, turbulence and/or flow vectoring,
  a pair of vertically oriented nozzle exit vanes downstream of the air outlet and configured to rotationally move to generate dynamic yaw, one of the nozzle exit vanes positioned laterally inward from a first sidewall of the nozzle and the other nozzle exit vane positioned laterally inward from a second sidewall of the nozzle which is laterally spaced from the first sidewall, and at least one horizontally oriented vane positioned downstream of nozzle contraction vanes and upstream of the nozzle exit vanes and configured to rotationally move to generate up-wash or downwash.

2. The turbulence generation system of claim 1, wherein the at least two nozzle contraction vanes are movably connected to a common frame assembly and together with the frame assembly defines a nozzle contraction vane station, wherein the nozzle contraction vane station is movable between a retracted, stowed condition and an extended, use condition, where in the retracted condition the nozzle contraction vane station is located beneath a floor of the nozzle.

3. The turbulence generation system of claim 2, wherein the nozzle floor includes an opening through which the nozzle contraction vane station is movable, and in the extended condition a lower part of the frame assembly is positioned substantially flush with the nozzle floor to close the opening, and a lower end of each nozzle contraction vane is shaped to match a contour of the nozzle floor to prevent the formation of vortices at the lower ends of the nozzle contraction vanes.

4. The turbulence generation system of claim 2, wherein the vane assembly includes a plurality of nozzle contraction vane stations, each nozzle contraction vane station is movable between the retracted condition and the extended condition independent of the other nozzle contraction vane stations.

5. The turbulence generation system of claim 4, wherein each nozzle contraction vane is an airfoil having a root chord and a tip chord which is dimensioned smaller than the root chord.

6. The turbulence generation system of claim 1, wherein each nozzle exit vane is a symmetric airfoil and is positioned laterally inward of the respective first and second sidewalls a distance of approximately a chord of the nozzle exit vane to maintain airflow attachment to the nozzle exit vane throughout dynamic yaw motion of the nozzle exit vane.

7. The turbulence generation system of claim 6, wherein each nozzle exit vane is positioned downstream of the nozzle air outlet a distance of three to five times the chord of the nozzle exit vane to further maintain airflow attachment to the nozzle exit vane throughout dynamic yaw motion of the nozzle exit vane.

8. The turbulence generation system of claim 1, wherein each nozzle exit vane is associated with an acoustic cabinet assembly housing a deployment mechanism, the deployment mechanism operably connected to the nozzle exit vane and configured to move the nozzle exit vane between a retracted, stowed condition and an extended, use condition, where in the retracted condition the nozzle exit vane together with the deployment mechanism is housed in the acoustic cabinet assembly.

9. The turbulence generation system of claim 8, wherein the acoustic cabinet assembly includes a cabinet and cover slidable between a closed position for covering an opening of the cabinet and an open position allowing for deployment of the nozzle exit vane.

10. The turbulence generation system of claim 1, wherein the horizontally oriented vane is configured to be selectively movable a vertical direction relative to a floor of the nozzle, and further including laterally spaced vertical supports mounted to the nozzle floor for supporting the horizontally oriented vane, each vertical support is airfoil shaped in top view.

11. The turbulence generation system of claim 10, wherein each vertical support includes a drive mechanism operably connect to the horizontally oriented vane and configured to vertically move the horizontally oriented vane.

12. The turbulence generation system of claim 1, wherein the vane assembly includes a second horizontally oriented vane differing in shape from the horizontally oriented vane, the second horizontally oriented vane having a leading edge, a trailing edge, opposite side sections and a central section, the side sections define a first angle of attack relative to the airflow and the central section defines a second angle of attack relative to the airflow that differs from the first angle of attack.

13. A turbulence generation system for use in aerodynamic and acoustic testing of a vehicle comprising:

a contraction section including a nozzle having a floor and first and second sidewalls, the nozzle defining an air inlet and an air outlet; and a vane assembly positioned in cooperative relationship with the contraction section to direct airflow from the nozzle, the vane assembly including:

a plurality of nozzle contraction vane stations located within the nozzle upstream of the air outlet, each nozzle contraction vane station including two vertically oriented nozzle contraction vanes movably connected to a common frame assembly, each nozzle contraction vanes is configured to rotationally move independent of the other nozzle contraction vane to generate airflow pressure loss, turbulence and/or flow vectoring, a pair of vertically oriented nozzle exit vanes, the nozzle exit vanes deployable from a stowed condition laterally outward of the respective first and second sidewalls to an extended condition downstream of the air outlet and laterally inward of the respective first and second sidewalls, the nozzle exit vanes configured to rotationally move to generate dynamic yaw, and a pair of horizontally oriented vanes positioned downstream of nozzle contraction vanes and upstream of the nozzle exit vanes, the horizontally oriented vanes configured to move in a vertical direction relative to the nozzle floor and configured to rotationally move to generate up-wash or downwash.

14. The turbulence generation system of claim 13, wherein each nozzle contraction vane station is movable between a retracted, stowed condition and an extended, use condition, where in the retracted condition each nozzle contraction vane station is located beneath the nozzle floor.

15. The turbulence generation system of claim 13, wherein each nozzle exit vane is positioned laterally inward of the respective first and second sidewalls a distance of approximately a chord of the nozzle exit vane and is further positioned downstream of the nozzle air outlet a distance of three to five times the chord of the nozzle exit vane, the positioning of the nozzle exit vanes maintains airflow attachment to the nozzle exit vanes throughout dynamic yaw motion of the nozzle exit vanes.

16. The turbulence generation system of claim 13, wherein one of the horizontally oriented vanes is shaped to define first and second differing angles of attack relative to the airflow.

17. The turbulence generation system of claim 13, wherein a lower end of each nozzle contraction vane of each nozzle contraction vane station is shaped to match a contour of the nozzle floor to prevent the formation of vortices at the lower ends of the nozzle contraction vanes.

18. A turbulence generation system for use in aerodynamic and acoustic testing of a vehicle comprising:
- a contraction section including a nozzle having a floor and first and second sidewalls, the nozzle defining an air inlet and an air outlet; and
- a vane assembly positioned in cooperative relationship with the contraction section to direct airflow from the nozzle, the vane assembly including:
  - a plurality of nozzle contraction vane stations located within the nozzle upstream of the air outlet, each nozzle contraction vane station including two vertically oriented nozzle contraction vanes movably connected to a common frame assembly, each nozzle contraction vane is configured to rotationally move independent of the other nozzle contraction vane to generate airflow pressure loss, turbulence and/or flow vectoring, each nozzle contraction vane station is movable between a retracted, stowed condition and an extended, use condition, where in the retracted condition each nozzle contraction vane station is located beneath the nozzle floor,
  - a pair of vertically oriented nozzle exit vanes, the nozzle exit vanes deployable from a stowed condition laterally outward of the respective first and second sidewalls to an extended condition downstream of the air outlet and laterally inward of the respective first and second sidewalls, the nozzle exit vanes configured to rotationally move to generate dynamic yaw, and
  - a pair of horizontally oriented vanes positioned downstream of nozzle contraction vanes and upstream of the nozzle exit vanes, the horizontally oriented vanes configured to rotationally move to generate up-wash or downwash, wherein the horizontally oriented vanes are operably connected to and supported by laterally spaced vertical supports mounted to the nozzle floor, each vertical support includes a drive mechanism operably connect to the horizontally oriented vanes and configured to vertically move the horizontally oriented vanes relative to the nozzle floor.

19. The turbulence generation system of claim 18, wherein each nozzle exit vane is positioned laterally inward of the respective first and second sidewalls a distance of approximately a chord of the nozzle exit vane and is further positioned downstream of the nozzle air outlet a distance of three to five times the chord of the nozzle exit vane, the positioning of the nozzle exit vanes maintains airflow attachment to the nozzle exit vanes throughout dynamic yaw motion of the nozzle exit vanes.

20. The turbulence generation system of claim 18, wherein a lower one of the horizontally oriented vanes is shaped different than the other horizontally oriented vane, the lower horizontally oriented vane defines first and second differing angles of attack relative to the airflow.

* * * * *